US010102158B1

(12) United States Patent
Nally

(10) Patent No.: US 10,102,158 B1
(45) Date of Patent: Oct. 16, 2018

(54) METHODS AND APPARATUS FOR PROCESSING MULTIPLE STREAMS OF DATA

(71) Applicant: ACCUSOFT CORPORATION, Tampa, FL (US)

(72) Inventor: Robert M Nally, Lakeland, FL (US)

(73) Assignee: Accusoft Corporation, Tampa, FL (US)

( * ) Notice: Subject to any disclaimer, the term of this patent is extended or adjusted under 35 U.S.C. 154(b) by 403 days.

(21) Appl. No.: 14/588,015

(22) Filed: Dec. 31, 2014

Related U.S. Application Data

(60) Provisional application No. 61/982,821, filed on Apr. 22, 2014, provisional application No. 61/982,755, filed on Apr. 22, 2014.

(51) Int. Cl.
G06F 9/28 (2006.01)
G06F 13/16 (2006.01)
G06F 13/28 (2006.01)

(52) U.S. Cl.
CPC .......... G06F 13/1668 (2013.01); G06F 13/28 (2013.01)

(58) Field of Classification Search
None
See application file for complete search history.

(56) References Cited

U.S. PATENT DOCUMENTS 6,792,446 B2 * 9/2004 Merchant ................ G06F 9/383
712/218

* cited by examiner

Primary Examiner — Cheng-Yuan Tseng
(74) Attorney, Agent, or Firm — Straub & Straub; Michael P. Straub; Stephen T. Straub

(57) ABSTRACT

Methods and apparatus relating to the transfer of data for processing and/or the transfer of the resulting processed data are described. Some features relate to a processing system which performs data transfers under control of a Dynamic Sequence Controller (DSC). In various embodiments a sequence of operational codes is used to control data transfer with the status of data source and destination locations taken into consideration. Modification of the op code sequence used to control the dynamic sequence controller and thus the transfer of data can be performed asynchronously to control of processing units which can be controlled via a command and control bus used to control the function of operators which process the data provided via the data bus.

10 Claims, 14 Drawing Sheets

| Mix. Master | | | | | | Attr. Comp. | Mix. | MixDEST | |
|---|---|---|---|---|---|---|---|---|---|
| CSS | MCS | Cull | FS | AS | Attr | Results | MASK | Attr | RGB |
| 00 | 00 | xx | x | x | xx | xx | xx | xx | Mix. Fill |
| 00 | 01 | xx | x | x | xx | xx | xx | xx | MixSCR1 |
| 00 | 10 | xx | x | x | xx | xx | xx | xx | MixSCR2 |
| 00 | 11 | xx | x | x | xx | xx | xx | xx | Blend |
| 01 | xx | 00 | 0 | x | xx | MixSCR 1 = MixSCR 2 | xx | xx | MixSCR2 |
| 01 | xx | 00 | 0 | x | xx | MixSCR 1 != MixSCR 2 | xx | xx | MixSCR1 |
| 01 | xx | 00 | 1 | x | xx | Mix. Fill = MixSCR 2 | xx | xx | MixSCR2 |
| 01 | xx | 00 | 1 | x | xx | Mix. Fill != MixSCR 2 | xx | xx | MixSCR1 |
| 01 | xx | 01 | 0 | x | xx | MixSCR 1 > MixSCR 2 | xx | xx | MixSCR2 |
| 01 | xx | 01 | 0 | x | xx | MixSCR 1 ! > MixSCR 2 | xx | xx | MixSCR1 |
| 01 | xx | 01 | 1 | x | xx | Mix. Fill > MixSCR 2 | xx | xx | MixSCR2 |
| 01 | xx | 01 | 1 | x | xx | Mix. Fill ! > MixSCR 2 | xx | xx | MixSCR1 |
| 01 | xx | 10 | 0 | x | xx | MixSCR 1 < MixSCR 2 | xx | xx | MixSCR2 |
| 01 | xx | 10 | 0 | x | xx | MixSCR 1 ! < MixSCR 2 | xx | xx | MixSCR1 |
| 01 | xx | 10 | 1 | x | xx | Mix. Fill < MixSCR 2 | xx | xx | MixSCR2 |
| 01 | xx | 10 | 1 | x | xx | Mix. Fill ! < MixSCR 2 | xx | xx | MixSCR1 |
| 10 | xx | xx | x | x | xx | xx | 00 | xx | Mix. Fill |
| 10 | xx | xx | x | x | xx | xx | 01 | xx | MixSCR1 |
| 10 | xx | xx | x | x | xx | xx | 10 | xx | MixSCR2 |
| 10 | xx | xx | x | x | xx | xx | 11 | xx | Blend |
| xx | xx | xx | x | 0 | 00 | xx | xx | Mix. Fill | xx |
| xx | xx | xx | x | 0 | 01 | xx | xx | MixSCR1 | xx |
| xx | xx | xx | x | 0 | 10 | xx | xx | MixSCR2 | xx |
| xx | xx | xx | x | 0 | 11 | xx | xx | Not Valid | xx |
| xx | xx | 00 | 0 | 1 | xx | MixSCR 1 = MixSCR 2 | xx | MixSCR2 | xx |
| xx | xx | 00 | 0 | 1 | xx | MixSCR 1 != MixSCR 2 | xx | MixSCR1 | xx |
| xx | xx | 00 | 1 | 1 | xx | Mix. Fill = MixSCR 2 | xx | MixSCR2 | xx |
| xx | xx | 00 | 1 | 1 | xx | Mix. Fill != MixSCR 2 | xx | MixSCR1 | xx |
| xx | xx | 01 | 0 | 1 | xx | MixSCR 1 > MixSCR 2 | xx | MixSCR2 | xx |
| xx | xx | 01 | 0 | 1 | xx | MixSCR 1 ! > MixSCR 2 | xx | MixSCR1 | xx |
| xx | xx | 01 | 1 | 1 | xx | Mix. Fill > MixSCR 2 | xx | MixSCR2 | xx |
| xx | xx | 01 | 1 | 1 | xx | Mix. Fill ! > MixSCR 2 | xx | MixSCR1 | xx |
| xx | xx | 10 | 0 | 1 | xx | MixSCR 1 < MixSCR 2 | xx | MixSCR2 | xx |
| xx | xx | 10 | 0 | 1 | xx | MixSCR 1 ! < MixSCR 2 | xx | MixSCR1 | xx |
| xx | xx | 10 | 1 | 1 | xx | Mix. Fill < MixSCR 2 | xx | MixSCR2 | xx |
| xx | xx | 10 | 1 | 1 | xx | Mix. Fill ! < MixSCR 2 | xx | MixSCR1 | xx |

FIGURE 10

| Attribute | | | | | | Fill Color Red | Mixer Fill Color (Mix.FillAR) |
|---|---|---|---|---|---|---|---|
| Fill Color Green | | | | | | Fill Color Blue | Mixer Fill Color (Mix.FillGB) |
| Alpha | | | | | | Beta | Alpha Blend Coefficients (Mix.Alpha) |
| CSS | MCS | Cull | FS | AS | Attr | Sel | Mixer Master Controls (Mix.Master) |

FIGURE 11

| Dynamic Sequence Controller ||| 
| SeqOp List | Routing | Sequencing ||
| --- | --- | --- | --- |
| SeqOp1 | mixDEST->MemOut | 0 | 1 |
| SeqOp2 | MemIn->MixSCR1 | 0 | 1 |
| SeqOp3 | MemIn->MixSCR2 | 0 | -2 |
| SeqOp4 | MemIn->ScSCR1 | 0 | 1 |
| SeqOp5 | MemIn->ScSCR2 | 0 | 1 |
| SeqOp6 | ScDEST->MemOut | 1 | -2 | -5 |

FIGURE 15

METHODS AND APPARATUS FOR PROCESSING MULTIPLE STREAMS OF DATA

RELATED APPLICATIONS

The present application claims the benefit of U.S. Provisional Patent Application Ser. No. 61/982,821 filed Apr. 22, 2014 and U.S. Provisional Patent Application Ser. No. 61/982,755 each of which is hereby expressly incorporated by reference in their entirety.

FIELD

The present application relates to data processing and more particularly to methods and apparatus for dynamically processing multiple data streams.

BACKGROUND

Various data processing systems today are in general the same, designs based upon a concept whereas a precompiled program operates upon a given data set in a predetermined matter. A concept proposed by John Von Neumann in the 1950s. The data is static and just waits for the program to do something with it. This type processing works fine for data bases and other static data sets, but now days the devices and systems expected to process dynamic streaming data like audio and video. Trying to process constantly changing streaming data with precompiled large programs is a daunting task in itself. When additional constraints like those imposed by Large Scale Integration technology as is used in SoC (Systems On a Chip) devices inside cell phones and other model devices are added, many feature sacrifices have to made to accommodate the memory bandwidth demands, the processing overload, and required data delivery rates streaming data dictates.

From the above discussion, it should be appreciated that there is a need for improved data processing methods and systems that allow or facilitate transfer of dynamic data for processing. It would be desirable if such methods and apparatus allow user interaction with streaming media to flourish. Various features described herein allow processing multiple streams of data by dynamically sequencing multiple blocks of data through multiple data processing operations concurrently.

SUMMARY

Methods and apparatus relating to the transfer of data for processing and/or the transfer of the resulting processed data are described.

Some features relate to a processing system which performs data transfers under control of a Dynamic Sequence Controller (DSC) which controls the transfer of data to and/or from processing elements. The system is designed to perform a number of different operations, e.g., in parallel, on a data stream or multiple data streams at the flow rate of the data streams, e.g., in other words in "real-time". The features of the present invention are well suited for use in various systems that manage, transport, and/or process streaming data, e.g., at real-time data rates.

In various embodiments a sequence of operational codes is used to control data transfer with the status of data source and destination locations taken into consideration. At the time an operational code is provided an opportunity to be considered for execution, the status of the data source and data destination is examined. If the data source and data destination are ready, e.g., the data source has data available and the data destination is ready to receive data the operational code is queued and sent for execution when the data bus becomes available to implement a data transfer. However, if the data source and destination are not ready at the time the operational code is provided an opportunity to be considered for execution, the operational code is skipped but will be considered again when it comes up the next time in the sequence of operation codes.

Since operation codes are considered for execution and queued if ready for execution, each operational code is given a fair opportunity to be executed. Since operational codes can be considered and queued for execution faster than the data transfers can be implemented, skipping of an operational code used to control data transfer does not result in wasted data bus resources.

Data processing operations are performed by one or more data processing units, also referred to as Operators, which read data from source data buffers and write data into one or more output data buffers. The source and data buffers are coupled to memory via the data bus over which data transfers are controlled by a dynamic sequence controller which implements operational codes used to control data transfers over the data bus. The sequence of operational codes can be used to control data transfers over the data bus in a manner that allows operator units to operate in a manner that does not require tight timing synchronization between the op code sequence and the processing performed by the data processing units/operators.

The methods and apparatus of the present invention are particularly well suited for image processing and/or other types of data processing operations where it may be desirable to move data, blocks of data, to an operator/processing unit which is to perform a processing operation prior to the resulting data being moved to memory or another processor.

The methods and apparatus are particularly well suited for processing image data where a recurring set of operations are to be implemented on data in blocks of a predictable size. Individual operators, e.g., processing units, may be used for a period of time to perform the same operation, e.g., an image processing related operation, prior to the processor being reconfigured for another type of operation. Reconfiguration of the operators may occur asynchronously to bus data transfers with reconfiguration of processing units being controlled over a common command and control bus which is separate from the data bus used to transfer blocks of data to/from buffers coupled to the input and/or output of the data processors. While one or more processing units are reconfigured, the other processing units may continue to be used, e.g., to process image data. Multiple operators may be configured and used in parallel or asynchronously with sequential processing of data being used to achieve a desired image processing operation in some embodiments.

While configuration of the processing units is controlled by a system control device with command and control signals being sent via a command and control bus to one or more of the processing units, the dynamic sequence controller is configured to control the transfer of data, e.g., to and/or from buffers associated with the inputs/outputs of the processors. The buffers, sometimes referred to as data handlers, allow the transfer of data to and from memory to operate in a manner that maybe and sometimes is, asynchronous to the rate at which the operators perform computations and generate results.

The dynamic sequence controller in some embodiments is a bus controller which is controlled via a set of stored instructions, e.g., op (operational) codes which are read from memory and which control the transfer of data over the bus. Thus, in at least some embodiments a set of op codes which are used in a recurring manner are used to control the transfer of data to/from buffers which feed data to operators and which store the output of the operators until the results are transferred over the memory bus to memory or another buffer. The sequence of op codes used to control data transfer can be stored in the same memory or a different memory than the data to be transferred.

Modification of the op code sequence used to control the dynamic sequence controller and thus the transfer of data can be performed asynchronously to control of processing units that is implemented via the command and control bus used to control the function of operators which process the data provided via the data bus.

Reconfiguration, e.g., modification of the op code sequence, of the instructions (op codes) used to control the dynamic sequence controller allows different blocks of data to be read out from memory and supplied to the various operators in different sequences depending on op code sequence used at a particular point in time. The op code sequence can be modified or replaced based on the data to be processed and/or the number of data streams being supported at a given time.

Implementation of a data transfer corresponding to an op code is, in some embodiments, conditional on the state of the buffers, e.g., data handlers, to which data is to be transferred to, or transferred from, in accordance with the op code. An exemplary op code used to control the data sequence control may, and in some embodiments does include, a destination identifier and a source identifier. The transfer of data from the identified source location to the identified destination location will be implemented at the time the op code is executed if the identified destination and source are ready at the time of execution for the data transfer. The status of the destination and source are indicated by the state of a corresponding status indicator signal sent to a source qualifier and/or destination qualifier which are responsible for generating a source and/or destination ready indicator in some embodiments.

In addition to a destination and source indicator, in some embodiments the op code also includes a branch indicator, a branch field and a next field. The branch indicator indicates whether op code branching is enabled or not. The status of the branch field may be altered to enable or disable branching at a particular point in time thereby altering the functionality of the dynamic sequence controller and the data transfers via a bit that can be altered to change the functionality and data transfers in a predictable way. The branch field indicates the memory location of the next op sequence code to be implemented by the dynamic sequence controller in the event the branch field indicates that branching is enabled while the next field indicates the memory location of the next op sequence coded to be used by the dynamic sequence controller in the event that the branch field indicates that branching is not enabled.

In the event that a op sequence is not implemented, e.g., skipped due to the status of one or more of the devices, e.g. data buffers, to be used in the data transfer associated with an op code being implemented, the op code will be processed but not executed and the dynamic sequence controller will move to the next op code in the op code sequence.

Thus, an op code will be executed and data transferred in accordance with the op code sequence if the data source and destination indicated in the op code, e.g., memory locations or buffers, are ready for the data transfer to be implemented in accordance with the op code but not if they are not ready, e.g., because the data in input buffers to an operator remains unused or because the operator has not yet loaded the result of an operator processing operation into the output buffer to make it available for transfer to memory. While op codes may be skipped, this does not waste data bus transfer resources since executable op codes will be queued and executed at the time the bus becomes available.

The use of buffers and the dynamic sequence controller allows operators, e.g., processing units, to operate at a different data rates and for the transfer of data to be supplied and moved over the data bus in a manner that allows for efficient use of such processors.

In the event an operator, e.g., processing unit, is taken off line for reconfiguration, the status of the input and/or output buffers associated with the operator remains fixed and data transfers associated with the operator are be halted due to the fixed status of the buffers associated with the off line operator.

In some embodiments an op code branch may be used to alter the operator sequence to take into consideration one or more operators being taken off line for processing or other reasons. Upon operator, e.g., processing unit, availability being restored the branch indication may be reset to indicate that branching is not to occur. Thus, through the alteration of one or more branch indicators the transfer of data can be readily configured to take into consideration the known status of various operators and/or to facilitate support of different data rates for a given data stream or different image processing for a given data stream.

The set of op sequence codes allows for sharing of the memory bus in a manner that can be readily optimized for processing image data of one or more streams in a time shared manner.

Accordingly, in at least some embodiments, the dynamic sequence controller is aware of the state of the data handlers (buffers) and works to coordinate the transfer of data, without the data sequence controller needing information about the operation being performed or the duration of the operation.

Thus, data transfer can be implemented in a manner that maybe asynchronous or loosely associated with the timing of operations implemented by one or more operators.

Data transfer operations may be, and in some embodiments are, controlled according to a recurring sequence of op codes. In the event a data transfer is not implemented by the dynamic sequence controller during one iteration of the recurring control sequence, it will be implemented during the next occurrence of the sequence assuming the conditions, e.g., states of the memory locations or data handlers, for implementing the data transfer are satisfied. For example, transfer of data to an input buffer of an operator may depend during an iteration of the op code sequence on the operator having processed the last set of input data while the transfer of data from an operator's output buffer may depend on the output buffer having been loaded by the operator with a new output result before the op code which is used to control transfer from the output buffer is reached.

The control sequence of the dynamic sequence controller may, and in some embodiments does, include branch instructions. This allows for a large degree of flexibility in terms of reusing sets of data transfer instructions and is particularly well suited for video applications where blocks of image data, corresponding to data streams, may be processed on a predictable recurring basis.

The methods and apparatus are particularly well suited for processing multiple streams of image data where a fixed set of operators maybe used to perform image processing operations, e.g., decoding or other operations, on image data corresponding to multiple data streams. The dynamic sequence controller instruction sequence can be updated to take into consideration characteristics of the streams to be processed, e.g., based on the number of steams to be supported at a particular point in time, the resolution, data rate and/or other stream characteristics. In this manner, by updating the set of instructions used by the dynamic sequence controller, the use and sharing of multiple operators can be optimized to take into consideration the nature of the data streams stored in the memory which are to be processed and, e.g., output for transmission or display.

The dynamic sequence can be configured to control the processing of multiple streams with different flow rates in a manner which makes efficient use of the various operators available at a given time.

Numerous additional features and embodiments will be discussed in the detailed description which follows.

BRIEF DESCRIPTION OF THE FIGURES

FIG. 10 illustrates an exemplary information table showing values and/or fields in the registers and data handlers associated with the Video and Graphics Mixing Operator of FIG. 9.

FIG. 11 illustrates an exemplary table 1100 showing the content of the registers that store control values used to control the operation of the exemplary Mixing Operator of FIG. 9.

FIG. 15 illustrates an exemplary table showing the setting of the SeqOp Code words in an exemplary SeqOp Code List used in an example.

DETAILED DESCRIPTION

Methods and apparatus relating to the processing of data, e.g., one or more multimedia data streams are described.

Some features relate to a processing unit/system which performs data transfers under control of a Dynamic Sequence Controller (DSC) which controls the transfer of data to and/or from processing elements. The system is designed to perform a number of different operations, e.g., in parallel, on a data stream or multiple data streams at the flow rate of the data streams, e.g., in other words in "real-time". The features of the present invention are well suited for use in various systems that manage, transport, and/or process streaming data, e.g., at real-time data rates.

Figure 1:
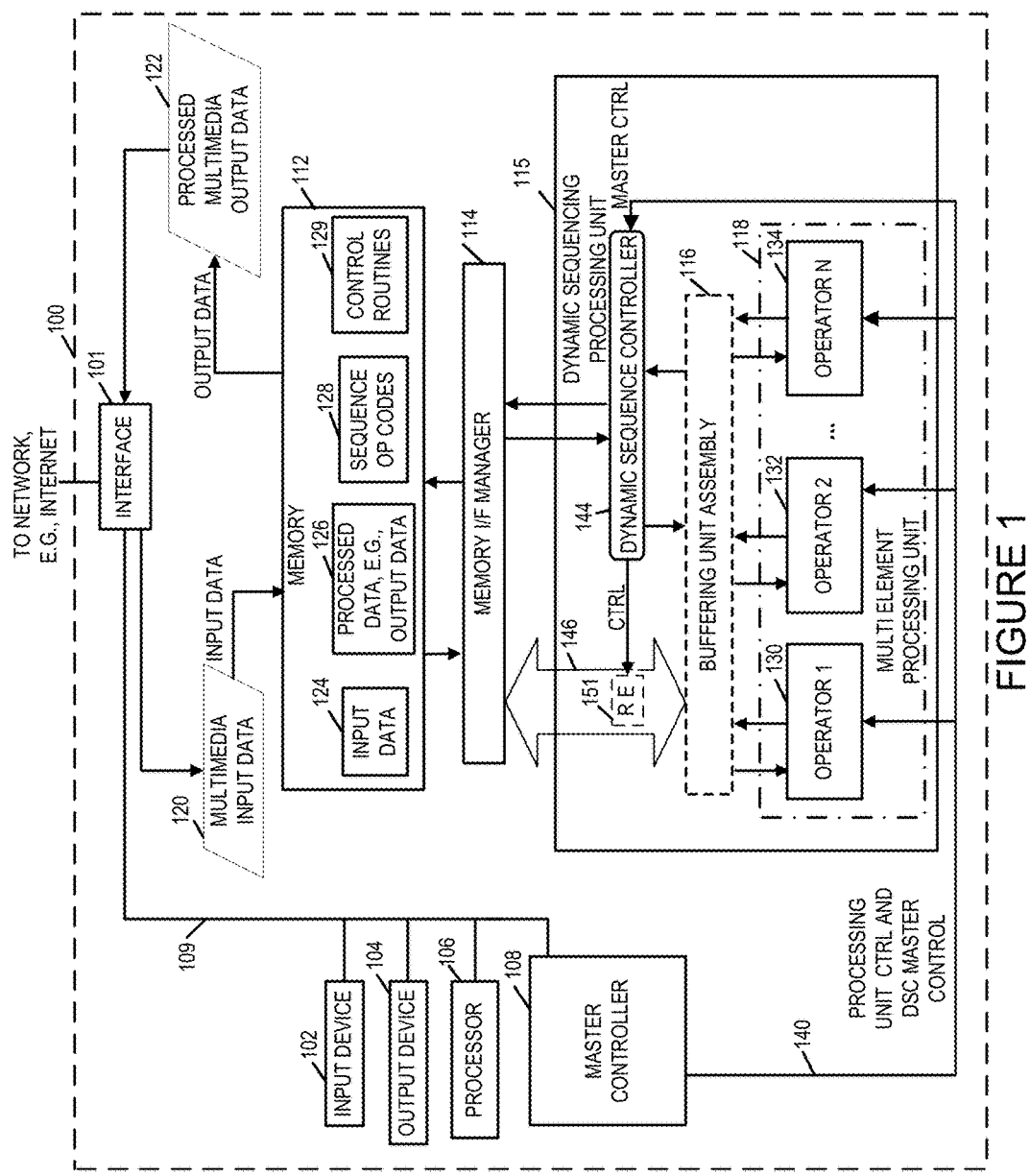
FIG. 1 is a block diagram of an exemplary system including an exemplary dynamic sequence controller and multiple processing elements, in accordance with one embodiment.

FIG. 1 is a block diagram of an exemplary apparatus 100 including an exemplary dynamic sequence controller (DSC) and various processing elements, in accordance with one embodiment.

In accordance with the features of some embodiments, an exemplary system 100, such as the one illustrated in FIG. 1 includes a combination of various functional units including, an input device 102, an output device 104, a processor 106, a master controller 108, a memory 112 including input data, output data and sequence operational codes, a buffering unit assembly 116 including a set of Data Handlers, a multi element processing unit 118 including a set of Operators, a memory interface (I/F) manager and bus controller 114 including a Dynamic Sequence Controller, and an interface that couples the apparatus to other networks, e.g., Internet. The various units work in coordination with each other to manage and process several real-time streams of data concurrently. The various components of the system 100 are coupled together via a bus 109 which allows for information to be communicated between the components of the apparatus 100.

In accordance with the features of some embodiments the apparatus 100 performs data transfers under control of the dynamic sequence controller (DSC) which controls the transfer of data to and/or from processing elements. Various features and/or elements of the exemplary apparatus 100 allow performing a number of different operations, e.g., in parallel, on a data stream or multiple data streams at the flow rate of the data streams, e.g., in other words in real-time. The system 100 performs data reception, transfer, processing, output and/or other operations in accordance with the invention.

Via the interface 101, the apparatus 100 can exchange signals, data and/or information with other devices and/or networks, over one or more communications network(s). The interface 101 supports the receipt and/or transmission of data and/or other information from/to different devices. To support the receipt and transmission of information, the interface 101 may include one or more receivers and transmitters. The input data, e.g., multimedia input data 120 is received via the interface 101 and stored in the memory 112 as input data 124 which is ready for further operations, e.g., processing, in accordance with the invention. The output data, e.g., processed data 126, may be stored in the memory 112 and/or communicated to another device via the interface 101.

The input device 102 may be a keypad, touch screen, and/or other device for receiving and processing input commands/instructions, e.g., from a user/administrator. The output device 104 may be a display device for displaying content including processed data sets and/or for outputting the processed data sets. The processor 106, e.g., a CPU, controls the apparatus 100 to operate in accordance with the invention and implement the transfer and processing operations in accordance with the invention. To control the operation of the apparatus 100, the processor 106 uses control routines, and/or instructions stored in memory 112.

The master controller 108 controls the dynamic sequence controller (DSC) 144 included in the dynamic sequencing unit 115 by providing control signals, e.g., master control input, thereby controlling the DSC 144 to prepare and perform different operations. The master controller 108 also controls the multi element processing unit 118 by providing processing control signals to various operators/processing units of the unit 118 via a command and control bus.

The memory 112 includes received input data 124, output data 126, e.g., processed data generated after processing the input data, and a memory block 128 including sets of sequence operational codes. The memory I/F manager 114 is a common memory management unit with address buses, data buses, and arbitration controls. The memory I/F manager 114 can be shared by a plurality of system elements to interface with the memory 112.

The dynamic sequencing processing unit (DSPU) 115 includes various elements that manage and process data streams concurrently in accordance with the features of the invention. The DSPU 115 includes a dynamic sequence controller (DSC) 144 a buffering unit assembly 116, a multi element processing unit 118 and a bus structure including data bus 141 and control and command bus 140. One or more controllable routing and/or selection elements 151 (shown as RE 151 in the figure) are associated with the data bus 140 and are controlled by the DSC 144 for routing the data in accordance with the features of the invention. While shown as being included in the memory 112, the memory block 128 including the sequence operational codes may be, and in some embodiment is, included in the dynamic sequence controller 144.

The buffering unit assembly 116 includes a plurality of buffers, sometimes also referred to herein as data handlers, which feed source data to the processing elements in the unit 118. The multi element processing unit 118 includes a plurality of processing elements, sometimes also referred to herein as operators, for processing the data received from the data handlers in the buffering unit assembly 116. The processed data is moved from the processing elements to a destination handler/buffering unit from where it can be moved to the memory 112 for output.

Figure 2:
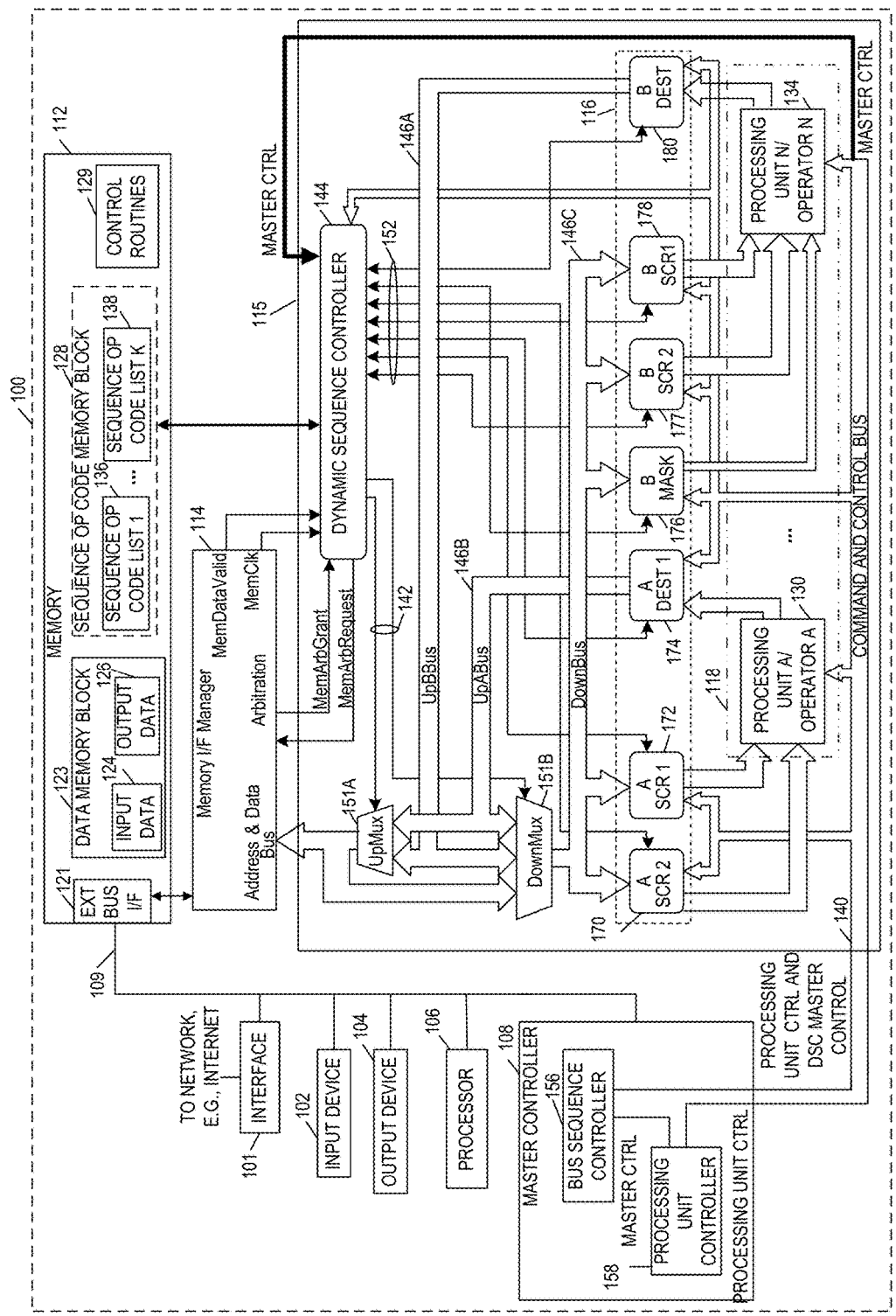
FIG. 2 is a drawing illustrating the apparatus of FIG. 1 and the elements included therein in greater detail.

FIG. 2 is a drawing illustrating the apparatus 100 of FIG. 1 and the elements therein in greater detail. FIG. 2 shows the various elements of the apparatus 100 listed above and in addition various other components and/or sub elements of the functional blocks are also shown.

The discussion will focus on the elements of the various functional blocks which are shown in FIG. 2 but were not discussed or shown in FIG. 1. Various other elements of the apparatus 100 that have been discussed with regard to FIG. 1 will not be described again.

In the block diagram of the apparatus 100 shown in FIG. 2, various additional elements of the blocks 112, 114, 116 and 120 are shown. As illustrated, the memory 112 includes an external bus interface 121, a data memory block 123, a sequence operational code memory block 128 and control routines 129. Via the external bus interface 121, the memory 122 interfaces with other elements of the apparatus, e.g., with input device 102, output device 104 and/or the memory I/F manager 142. The data memory block 123 includes input data 124 and output data 126, e.g., processed data. The sequence operational code memory block 128 includes a plurality of sets of sequence operation codes (SeqOp codes) including sequence operational code list 1 136 through sequence operational code list K 138, with each of the code word list including one or more SeqOp code words.

A Sequence Operation Code or SeqOp Code, is a set of instructions which is used to manage data flow, bus management, routing, and execution in accordance with the invention. In various embodiments the SeqOp code sets are not pre-compiled and can be changed dynamically. In accordance with one feature of some embodiments the master controller 108 provides master control input (master ctrl) to the DSC 144 in the DSPU 115 to control the DSC 144 to select which of a plurality of sequential operational code words (SeqOp code) to load from the memory block 128 for execution, e.g., when the DSC 144 is initialized for a task. In various embodiments the processor 106 and/or the master controller 108 is aware of the type of data that has to be transferred from the memory 112 for processing and thus can make a decision as to which SeqOp code word the DSC 144 should load and execute to control the transfer and routing of data to the data handlers and operators/processing units. The master controller 108 includes a bus sequence controller 156 and a processing unit controller 158. The bus sequence controller 156 generates the master control input that is provided to the DSC 144 to point out the memory location of the starting SeqOp codeword in a sequence of SeqOp codes. Following the receipt of the master control input the DSC loads the SeqOp code for execution to control data transfer from the memory 112 to the data handlers. Furthermore, the master control input can be used to modify the existing SeqOp code loaded in the DSC 144 memory, e.g., for example, for performing a new/different task. Independent of this data transfer control operation, in at least some embodiments, the processing unit controller 158 provides the processing unit control input to control the one or more processing units to process the data that is currently being operated upon by the processing units/operators. The Sequence Operation Code are discussed in more detail later.

The Memory I/F manager 114 is a common memory management unit with address buses, data buses, and arbitration controls. The memory I/F manager 142 can be shared by a plurality of system elements to interface with the memory 112. Thus the memory I/F manager 142 facilitates interfacing of different functional blocks with the memory 112. In some embodiments the Dynamic Sequencing Controller 144 arbitrates for memory bandwidth just as other systems or devices sharing the memory I/F manager 114. The memory I/F manager 114 is used to interface the DSPU's internal bus structure to the memory 112 via the external bus interface 121 of memory 112. In various embodiments the DSPU 115 is designed such that it may be employed in a number of configurations, for example:

1. As a stand-alone unit, in which case the external bus is just a memory bus to a memory that the DSPU 115 has access to.
2. As a sub-system unit, in which the Memory I/F Manager 114 is just another device in a larger system and arbitrates for external bus utilization.
3. As a gang of DSPU's with no central memory controls that share the same memory, in which case the memory I/F unit 114 just arbitrates for external bus utilization.

As can be appreciated, FIG. 2 shows the elements of the DSPU 115 including the bus structure and signaling in greater detail. The dynamic sequence controller 144 controls the transfer of data from the memory 112 via the data bus 146 (including the up and down data buses 146A, 146B and 146C) by controlling the routing and/or selection elements (RE) such as the UpMux 151A and DownMux 151B. The buffering unit assembly 116 includes the source data handlers A SCR1 170, A SCR2 172, B MASK 176, B SCR1 178, and BSCR2 177, and the destination data handlers including A DEST 174 and B DEST 180. The Sourcing Data Handlers in the buffering unit block 116 (A SCR1, A SCR2, B MASK, B SCR1, and BSCR2) feed source data to the Operators (e.g., to OperatorA 130 to OperatorN 134). The Operators feed the results of the operation, e.g., processed data, to the Destination Data Handlers (e.g., A DEST 174 and B DEST 180). In some embodiments an operator may have a number of source data handlers inputting data into the operator, but there is one destination data handler per operator in at least one embodiment. The Dynamic Sequence Controller 144 controls the routing of the streaming data between the Data Handlers. The control signaling between the DSC 144 and the data handlers in the buffering unit 116 is illustrated in the figure by the group of bidirectional arrows 152.

There is no theoretic limit as to how many Data Handlers or Operators there may be in a single system. Furthermore, there may also be, and in some embodiments is, more than one Down Bus, but the Dynamic Sequence controller 144 may be expanded to manage the various Down Buses concurrently.

Some of the advantages of the exemplary dynamic sequencing processor unit 115 including the dynamic sequence controller (DSC) 144 include:

1. The unit 115 functions as a processor, with the DSC 144 behaving as a controller. The unit functions as a processor in the sense, that it is designed to perform logical and/or arithmetic operations on the data, e.g., one or more streams including multimedia data. The Operators in the unit can be thought of as being the processing elements, e.g., ALUs (Arithmetic Logic Units) of the system (which in many cases are the heart of a Data Processor). The DSC 144 behaves as a controller in the sense that it does not require a pre-compiled instruction set (i.e. Machine Code) in order to function (i.e., run). In some embodiments for a given operation, the Operators in the processing unit 118 and Data Handlers in the buffering unit 116 are first set up for the task by programming their register sets or instruction sets, e.g., via a command and Controls Bus. This is said to be "priming" the process where the processors are configured for the task or tasks to be performed such as, e.g., audio decoding, video decoding, stream demultiplexing (splitting) and/or other functions. In the priming process, if the operators utilize an instruction set like a general purpose processor does, this instruction set is downloaded into the operator's instruction cache. In various embodiments the operators do not constantly compete with data for memory bandwidth. Then the SeqOp Code List in the Dynamic Sequence Controller 144 is either loaded with a new set of SeqOp Code Words or the existing SeqOp Code Words in the list are modified to perform the new task. This is said to be "running" the process. The content of the SeqOp Code Word List memory is modified via the Command and Control Bus 140 (e.g., by sending the master control input to the DSC 144 over the command and control bus 140). No Command and Control Bus activities interfere with the current and active operations because of the shadow register concept.

2. The features of the invention allow the system to efficiently manage the Bus utilization, and manage several operations concurrently without loss of bus bandwidth to system bus or system operation management.

3. New operations can be entered into, and old operations exited from, dynamically without disrupting the other operations currently running, and once again, without loss of bus bandwidth to operation management.

4. Various features allow management and operation upon several extremely high bandwidth real-time data streams concurrently without loosing bandwidth to the management and control of any of the operations.

5. The features of the invention provide almost no system management overhead.

Some of the features of the system include:

1. A combination of Shadow control registers and a program instruction set control the DSPU 115. Control Registers are used to define the operational functionality of the Data Handlers 170 through 180 and the Operators 130 through 134. The Sequence Operation Code or SeqOps Code, is used to manage data flow and bus management and routing, and execution. A shadow register is a two stage register. The host can read and write into the I/O stage, but can read the execution stage. The content of the I/O stage is moved to the execution stage when a control bit in a master control register is set. This allows a set of registers to be reprogrammed in any desired order at any time in the I/O stage. The content in the I/O stages of the registers are loaded into each register's associated execution stage, at the same time when the bit in the master control is set.

2. The exemplary DSPU 115 takes advantage of the nature of streaming data by routing the data through the unit in block units yet maintaining data precision in the operator units. For example, two different streams of data being merged to produce a third stream requires precision control in the operator yet only one data stream may be on the bus at any given time. By blocking the stream data into block units, the real-time streams can time-share the same bus.

3. Another unique aspect is that the Dynamic Sequence Controller 144 makes a determination as to when a SeqOp code should be executed and when it should be discarded. In some embodiments, before a SeqOp code is allowed to execute, a set of system conditions relating to that SeqOp code has to be met. If the set of conditions are not met, the SeqOp code will be skipped over. In some cases skipping a SeqOp code simply means either the Data Handlers and/or Operators associated to that SeqOp code are not ready to perform the task the SeqOp Code, data Handlers, and Operators are assigned to perform. Thus when a SeqOp code is skipped, what is really happening is that the SeqOp code is forfeiting its allotted time slot or block time on the bus.

Figure 3:
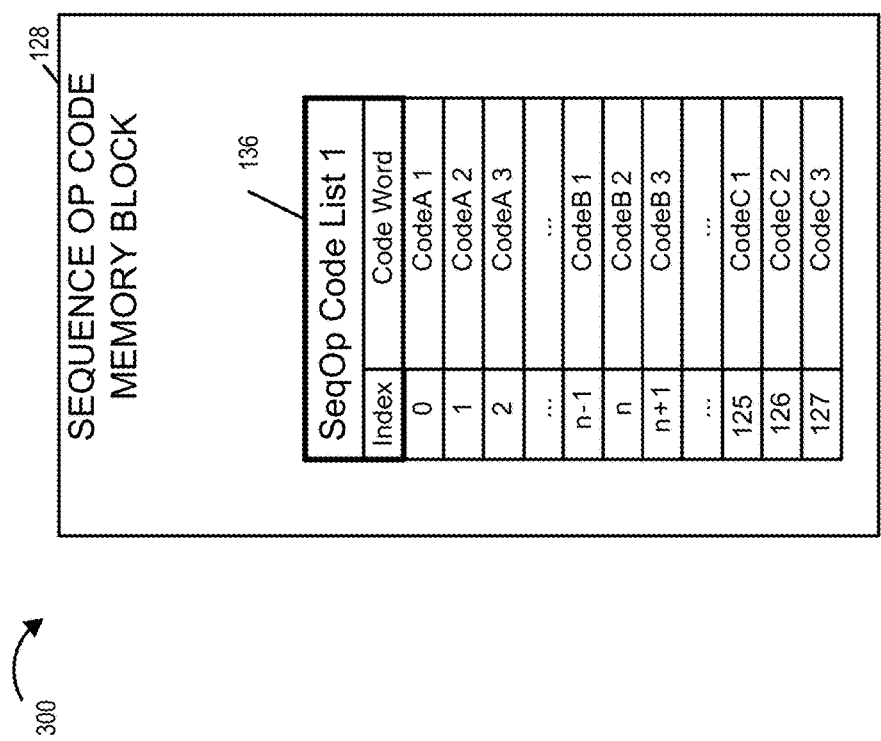
FIG. 3 shows an exemplary sequence operation code memory block including an exemplary sequence operation code list.

FIG. 3 shows an exemplary sequence operational code memory block 128 including an exemplary sequence operation code list 1 136. In some embodiments the sequence operational code memory block 128 that includes SeqOp code sets, e.g., lists, is part of the system memory 112 but is separate from the data memory block. In some other embodiments the SeqOp code sets may be stored in a separate memory. In one embodiment this memory is a 128×32-bit embedded SRAM. A SeqOp Code List includes one or more SeqOp Code Words. As shown, the exemplary SeqOp Code List 1 136 includes one or more SeqOp Code Words including codeA 1, codeA 2, codeA 3, . . . , codeC 3. In some embodiments each SeqOp Code Word includes two components, a Data Routing Control component and a SeqOp Sequencing component.

Figure 4:
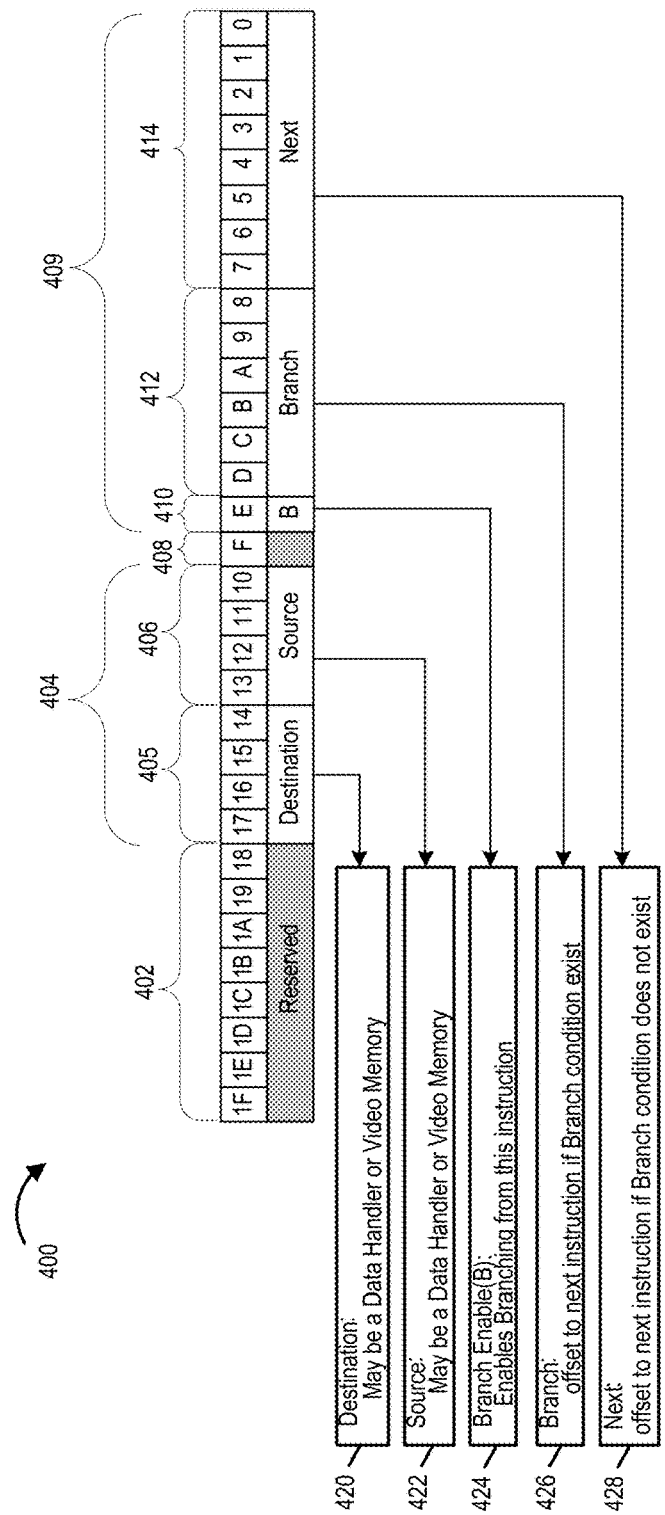
FIG. 4 illustrates an exemplary Sequence Operational (SeqOp) Code Word.

FIG. 4 illustrates an exemplary Sequence Operational (SeqOp) Code Word 400. The exemplary (SeqOp) Code Word 400 may be one of the SeqOp codes stored in the SeqOp code memory block 128. In accordance with one aspect, the SeqOp Code Word 400 includes two components, a Data Routing Control component 404 and a SeqOp Sequencing component 409.

The data Routing Control component 404 includes the Destination field 405 (bits 0x17-0x14) and the Source field 406 (bits 0x13-0x10). The Source field 406 includes the identifier of the Source Data Handler (or Video Memory) that is to receive the data that is to be transferred on the bus as indicated in the figure by the information box 422. The Destination field includes the identifier of the Destination Data Handler (or Video Memory) that is to place the data on the bus as indicated in the figure by the information box 420. It should be appreciated that the naming convention of the Data Handlers discussed above is selected with respect to role the data handlers play with regard to the Operators, that is either a data handler sources data to an operator or becomes a destination for the data output from an operator. Source Data Handlers supply or source data to the operators/processing units. Destination data handlers sinking data from the operators.

In various embodiments when a SeqOp is being executed, a full block of data called a Data Block Transfer Unit (DBTU) is transferred from the Data Handler or Memory array identified by the value in the Destination Field 405 to the Data Handler or memory Array identified by the Source Field 406. The SeqOp will remain in execution until the DBTU is complete. In some embodiments only one SeqOp Code Word is executed for every DBTU period.

The SeqOp Sequencing component 409 includes the Branch Enable Flag 410 (bit 0x1E), the Branch Offset Pointer field 412 (bits 0x0D-0x08), and the Next Offset Pointer field 414 (bits 0x07-0x00). Either the Next Offset Pointer field 414 or the Branch Offset Pointer field 412 defines the offset to the next SeqOp code in the SeqOp Code List to be staged, depending on the state of the Branch Enable flag 410 and the status of the SeqOp code being staged. In some embodiments both the Next Offset Pointer field 414 and the Branch Offset Pointer field 412 are programmed with a one's compliment value so that the DSC 144 may move either forwards or backwards into the SeqOp Code List. Information box 424 indicates that the branching operation can be controlled by the value of the branch enable bit 410. Information box 426 indicates that the branch offset pointer field 412 includes the offset value that can be added to the address of the OpCode currently being executed to get the next SeqOp code from the SeqOp code list for staging, if branching condition exist, e.g., when branch flag is set. However if the branching condition does not exist, e.g., branch enable flag 410 is not set, the DSC 144 offsets to the next SeqOp code (for staging and execution) using the offset indicated by the bits in the Next offset pointer field 414, provided that the Next offset pointer field 414 is not set to zero. Information box 428 indicates that the next offset pointer 414 indicates the offset to the next SeqOp code if branch condition does not exist.

In accordance with one aspect of some embodiments, if the Next Offset Pointer field 414 of the executing SeqOp code is programmed with a zero, the same SeqOp code is continuously staged and executed repeatedly until the Next Offset Pointer field 414 is programmed with some other value. In this state the DSC 144 is said to be idling.

Figure 5:
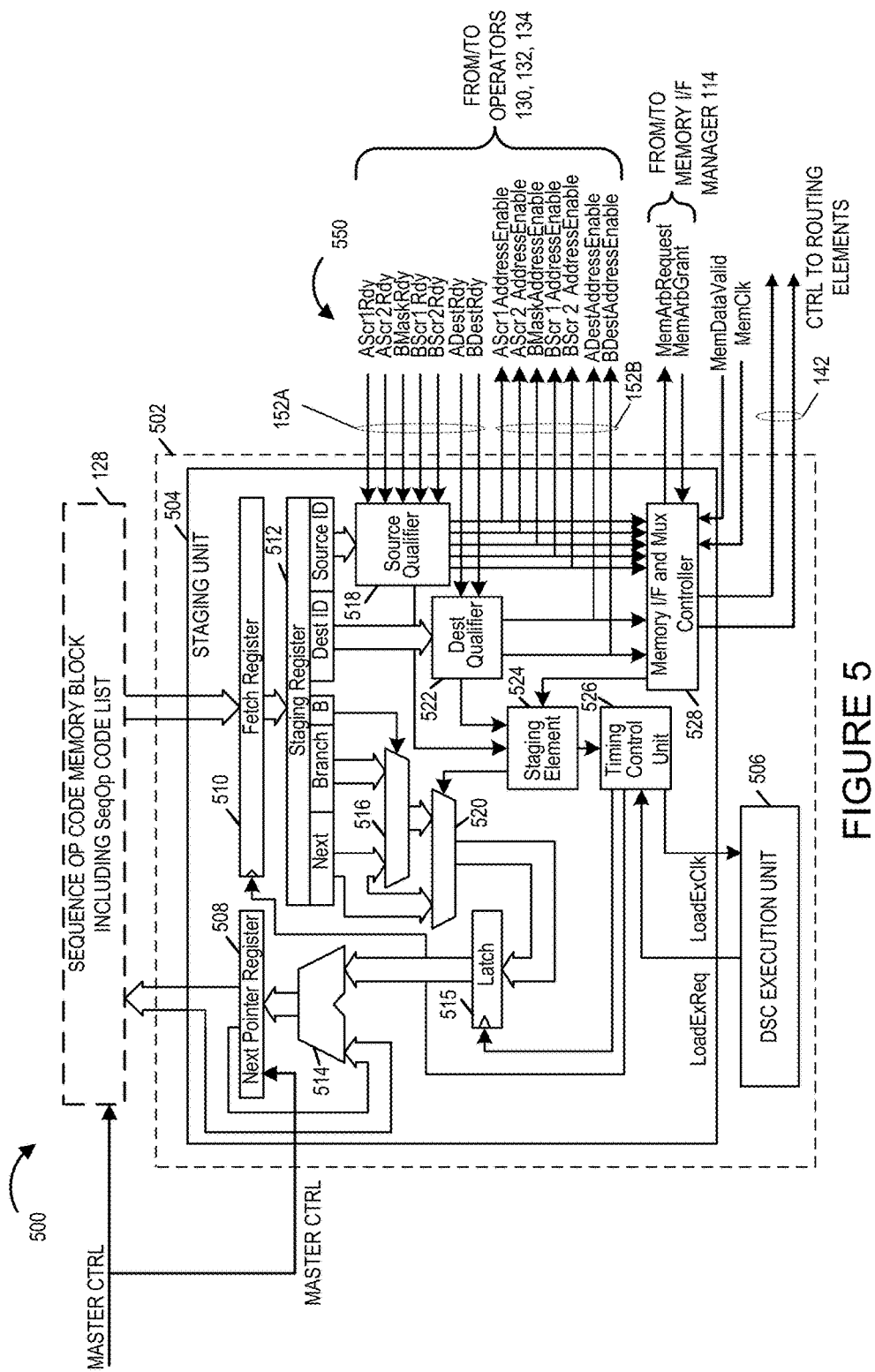
FIG. 5 illustrates a block diagram showing the elements of an exemplary dynamic sequence controller (DSC).

FIG. 5 is a drawing 500 illustrating an exemplary dynamic sequence controller (DSC) 502 and the elements therein. FIG. 5 further shows signaling between the elements of the DSC 500 and the various data handlers as indicated by arrow 550. The DSC 502 can be used as the DSC unit 144 shown in FIGS. 1 and 2. The Dynamic Sequence Controller (DSC) 500 includes various elements including, a Staging unit 504, and an Execution Unit 506.

The memory unit 128 is used to store a SeqOp code or a set of SeqOp codes, e.g., Sequence Operations Code (SeqOp) Word List. A SeqOp code stored in the memory 128 can be transferred to the staging unit 504 of the DSC prior to execution. While the memory unit 128 is shown as being external to the DSC unit 502 in the illustrated embodiment, in some other embodiments the memory unit 128 may be included in the DSC 502. In some such embodiments the SeqOp code or the set of SeqOp codes is loaded into the memory unit 128 from an external memory, e.g., such as the memory 112 which is external to the DSC. However this is not necessary in all embodiments and the SeqOp code to be executed may be fetched from the external memory.

In some embodiments the SeqOp code words are fetched from the memory 128 including the SeqOp Code List by the DSC Staging unit 504. The staging unit 504 includes a next pointer register 508, a fetch register 510, a staging register 512, an adder 514, a latch 515, MUXes 516, 520, a source qualifier 518, a destination qualifier 520, 522, a staging element 524, a timing control 526, and a controller unit 528. In the staging unit 504 the SeqOp Code Word is loaded into the Staging register for a staging operation. In some embodiments when the DSC 502 is initialized, a master control input from a controller/processor such as the master controller 108 of FIG. 1-2, modifies and/or loads the next pointer register 508 with the address of the next SeqOp code word to be fetched for staging and execution. Thus in some embodiments at the time of initialization the master control input loads the address for the SeqOp code word to be fetched into the DSC. In some embodiments the staging operation is a two-part operation as discussed below.

The first part is to qualify the Data Handlers identified by the Destination Identifier field and the Source Identifier field in the SeqOp Code Word. The qualification is done in the Dest Qualifier unit 522 and the Source Qualifier unit 518 based on the signaling 152A received from the destination and source data handlers.

In various embodiments each Source Data Handler in the system has a XScrNRdy signal input into the Source Qualifier 518. In some embodiments if the Source Identifier field identifies a Source Data Handler that has an active ScrNRdy signal, the Source Qualifier 518 will generate a ScrRdy signal to the Staging element 524 if either of the following conditions is met:

1. If the value in the source field in the SeqOp Code Word (loaded in the staging register 512) is the identifier of a Source Data Handler.

2. If the value in the source field in the SeqOp Code Word is the identifier of the Memory I/F Manager, e.g., memory I/F manager 114 shown in FIGS. 1-2, the DSC Staging Unit 504 generates a MemArbRequest signal to the Memory I/F Manager 114. In some embodiments the MemArbRequest signal is generated by the Memory I/F and Mux controller 528 in the staging unit 504. When the memory I/F manager 114 is ready to transfer data it responds with a MemArbGrant signal back to the memory I/F and mux controller 528 of the DSC staging unit 504. The output signal from the memory I/F and mux controller 528 to the staging element 524 is always active unless the memory I/F and mux controller 528 has generated a MemArbRequest but has not yet received the MemArbGrant signal back from the Memory I/F manager 114. This output signal from the memory I/F and mux controller 528 is a block signal, as it prevents the status signal indicating the status of the Source qualifier 518 and Dest qualifier 522 (the other two inputs into the staging element 524) from reaching the Timing control unit 526. The Timing control unit 526 launches the execution cycle (i.e. the transition from staging to execution). Following receipt of the MemArbGrant signal the ScrRdy signal is generated and sent to the staging element 524.

In various embodiments each destination Data Handler in the system has a XDestRdy signal input into the Source Qualifier 518. In some embodiments if the Destination Identifier field identifies a Destination Handler that has an active XDestRdy signal, the Destination Qualifier 522 will generate a DestRdy signal to the Staging element 524 if either of the following conditions is met:
1. If the value in the Destination field in the SeqOp Code Word is the identifier of a Destination Data Handler.
2. If the value in the Destination field in the SeqOp Code Word is the identifier of the Memory I/F Manager, the DSC Staging Unit 504 generates a MemArbRequest signal to the Memory I/F Manager 114. When the memory I/F manager 114 is ready to transfer data it responds with a MemArbGrant signal back to the memory I/F and mux controller 528 of the DSC staging unit 504. Following receipt of the MemArbGrant signal from the Memory I/F Manager 114 the DestRdy signal is generated and sent to the staging element 524.

The Staging element 524 makes the determination to either transfer the SeqOp code from the Staging Register 512 in the Staging Unit 504 to an Execution Register in the Execution Unit 506 or to discard the SeqOp code in the Staging Register 512. In some embodiments the determining factor is that both the ScrRdy and the DestRdy signals are active before the SeqOp can be loaded into the Execution unit 506. If the determination is to execute, then the Staging Unit 504 enters into a wait state condition until the Execution Unit 506 generates a LoadExReq signal. After the Timing Control unit 526 detects an active LoadExReg signal, on the next clock cycle it loads the content of the Staging Register 512 in the Staging Unit 504 into the Execution Register in the Execution Unit 506 with the LoadExClk signal. The content of the Fetch Register 510 is then loaded into the Staging register 512 and the Staging Unit 504 begins the process of staging the next SeqOp Code Word to be executed.

The Second part is loading the Fetch Register 510 with a Code Word, e.g., a new SeqOp code, from the SeqOp Code List in the memory 128. In various embodiments the Next Pointer Register 508 includes the index position of the next SeqOp Code Word to be fetched from the SeqOp Code List. The Timing Control Unit 526 strobes the FetchLatchClk signal to latch the SeqOp Code Word into the Fetch Register 510. In some embodiments the Next Pointer Register 508 is modified every time a new SeqOp Code Word is loaded into the Staging Register 512. In some embodiments the Staging element 524 and the Branch Enable Flag (B) in the Staged SeqOp Code Word determines how the Next Pointer Register 508 is to be modified. If the Staging element 524 determines that the currently staged SeqOp Code Word is to be loaded into the execution unit for execution, the content of the Next Offset Pointer field (Next) in the currently staged SeqOp Code Word is automatically added to the existing value in the Next Pointer Register 508 by the logic element 514 which may be, e.g., an adder. If the Staging element 524 determines that the currently staged SeqOp Code Word in the Staging Register 512 is to be discarded, then the Branch Enable Flag (B) of the same SeqOp Code Word determines how the Next Pointer Register 508 is modified. If the Branch Enable Flag (B) is set to one (1) the value in the Branch Offset Pointer (Branch) field of the currently staged SeqOp Code Word is added to the Next Pointer Register 508, otherwise the value in the Next Offset Pointer (Next) field is added. In various embodiments the logic element 514 adds either a negative or positive (2's compliment add) value (output from the latch 515) to the address of the current OpCode executing (e.g., the last SeqOp Code staged) to get the address of the Next SeqOp Code to stage.

In some embodiments every time a SeqOp code word is staged, one of the following events may occur depending on the current dynamics of the system. The events include:
1. The currently staged SeqOp Code word is loaded into the execution unit 506 for execution and the SeqOp code pointed to by the "Next" field of the currently staged SeqOp Code word is fetched for staging.
2. The currently staged SeqOp Code word is discarded and the SeqOp code pointed to by the "Next" field of the currently staged SeqOp Code word is fetched for staging.
3. The currently staged SeqOp Code word is discarded and the SeqOp code pointed to by the "Branch" field of the currently staged SeqOp Code word is fetched for staging.

In various embodiments the Data Handlers' status does not change between the DSC staging operation and the DSC execution operation. If a Data Handler is determined to be ready in the staging unit 504, then it is ready to transfer data during the execution operation. The DSC Execution Unit 506 manages the gating of data onto and off the data bus, the Clock distribution to the Data Handlers, and the interface to the Memory I/F Manager.

In various embodiment the DSC Execution Unit 506 does not clock data on to or off the Data Bus, e.g., data bus 146, however it does setup the path for data to move through the data bus as it moves from Data Handler to Data Handler, Data handler to memory, and/or memory to Data Handler. In various embodiments the Data Handlers do the data clocking themselves, but the DSC Execution Unit 506 provides the clock. In some embodiments the Memory I/F Manager 114 provides the DSC 502 with a master clock, e.g., the MemClk. The DSC 502 distributes this clock to the Data Handlers, so that the memory and the Data Handlers are synchronized to the same clock.

Figure 6:
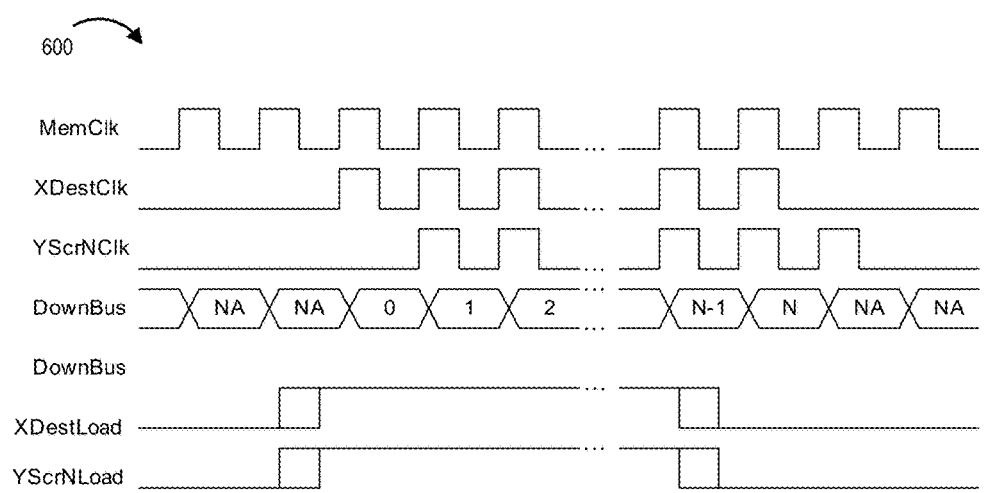
FIG. 6 illustrates a Bus timing control diagram showing one Data Block Transfer Unit (DBTU) time period.

FIG. 6 illustrates a timing diagram 600 showing bus timing controls for one DBTU time period. It can be appreciated from timing diagram 600 and the following discussion that the exemplary DSC controls distribution of the master clock to the data handlers, e.g., by generating and providing control signaling. As the timing diagram 600 shows, the Destination Data Handler (XDest) clock, XDestClk, is the MemClk clock gated by the XDestLoad signal, and the Source data Handler (YScrN) clock, YScrClk, is the MemClk clock gated by the XScrNLoad signal. As can be appreciated from FIG. 6, the XDestClk becomes active one MemClk after XDestLoad goes active and YScrNClk becomes active two MemClks after YScrNLoad becomes active. It should be noted that as YScrNClk is clocking Data 0 off the DownBus that XDestClk is concurrently clocking Data 1 onto the DownBus.

In various embodiments basically two types of Data Handlers are used, e.g., Source data handler and Destination data handler. Source Data Handlers are used to manage the streaming data that is input into an Operator. A Destination Data Handler handles the streaming data output by an Operator. In some embodiments an Operator may have a number of Source Data Handlers inputting data into the Operator, but there is one Destination Data Handler per Operator.

Figure 7:
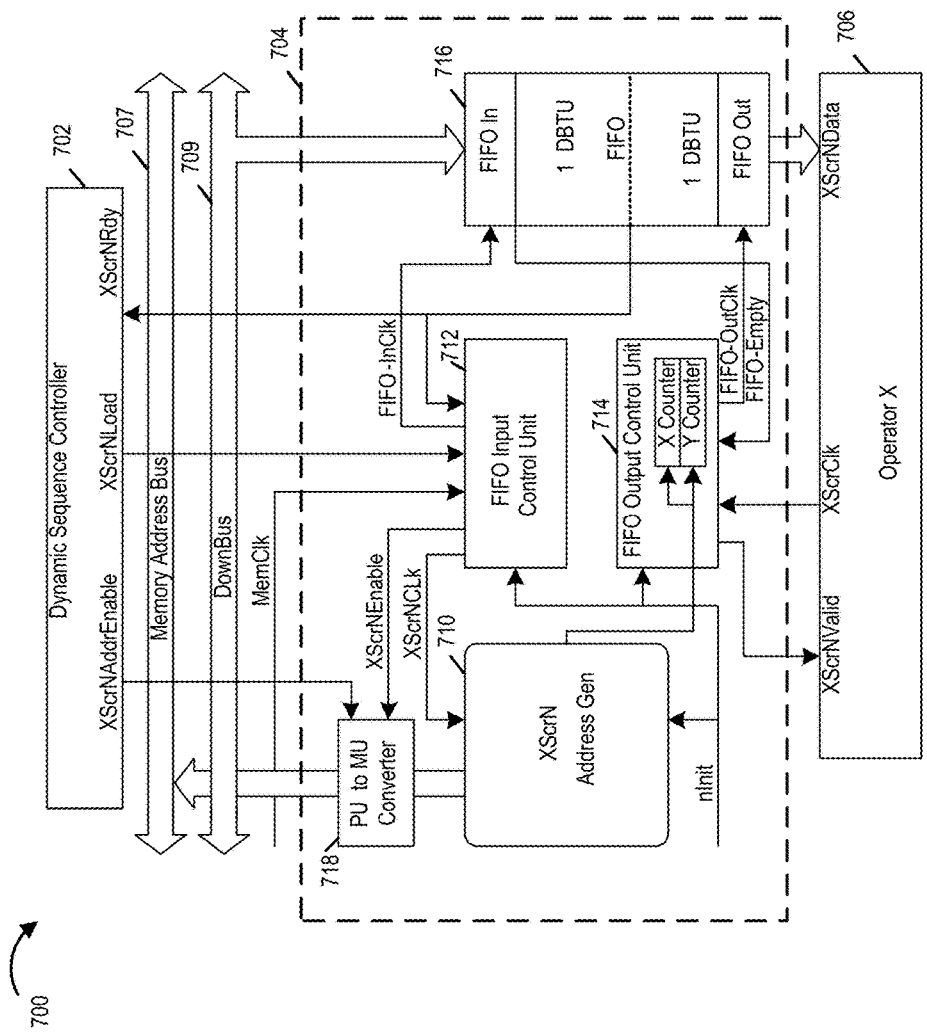
FIG. 7 illustrates the structure of an exemplary source data handler and how it interfaces to a Dynamic Sequence Controller (DSC), a Dynamic Sequence Controlled Bus Structure, and an Operator, in accordance with some embodiments.

FIG. 7 is a diagram 700 illustrating the structure of an exemplary source data handler 704 and how it interfaces to a Dynamic Sequence Controller (DSC) 702, the Dynamic Sequence Controlled Bus Structure, and an Operator 706, in accordance with some embodiments. In various embodiments a Data Handler itself generates the memory addresses for the data. As discussed below, in various embodiments the address is generated by an address generator unit of the data handler.

FIG. 7 shows interfacing of the exemplary Source Data Handler 704 to the Dynamic Sequence Controller 702, e.g., DSC 502, the Dynamic Sequence Controlled Bus Structure (707, 709), and the Operator X 706. The DSC 704 of FIG. 7 is the same or similar to the DSC 144 and/or 502 discussed earlier. The source data handler 704 of FIG. 7 can be used as any of the source data handlers 170, 172, 176, 177 and 178 shown in FIG. 1. The operator X 706 e.g., a processing unit, can be used as one of the operators 130 through 134 of FIG. 1.

The exemplary source data handler 704 includes a 2 dimensional source address generator illustrated in Figure as the XScrN Address Generator 710, a FIFO unit 716, a FIFO input control unit 712, and a FIFO output control unit 714. In various embodiments a low pulse on the nInit input signal triggers the address generator 710. The XScrN Address Generator 710 generates an address to be placed on the Memory Address Bus 707 when the DSC 702 enables the Data Handler with the XScrNAddrEnable signal. In some embodiments if the data to be placed on the DownData Bus 709 is coming from another Data Handler, the XScrNAddrEnable signal is not generated and the address in the XScrN Address Generator 710 is just a dummy address and is be discarded. However if the data is coming from the Memory I/F Unit, e.g., memory I/F manager unit 114, the DSC 702 generates the XScrNAddrEnable signal, which gates the address onto the Memory Address Bus 707. In some embodiments before an absolute memory address can be placed onto the Memory Address Bus 707 the PU to MU (Pixel unit to Memory unit) converter 718 converts a pixel address count to a memory address. The memory address from the PU to MU converter 718 is placed onto the bus 707. In some embodiments the PU to MU converter 718 is included in the XScrN Address Generator 710.

The FIFO input and output control units 712, 714 provide FIFO-InClk and FIFO-OutClk signals to the FIFO unit 716. Before the Data Handler 704 can start clocking data into the FIFO unit 716 it waits until the DSC 702 indicates the data on the bus is valid. In various embodiments the DSC 702 generates a XScrNload signal to indicate that the data on the DownData Bus is valid. On the second rising edge of the MemClk after XscrNLoad goes active, the Data Handler starts clocking data into its FIFO unit 716 and continues to clock data until 2 MemClk cycles after XscrNLoad goes inactive.

Figure 8:
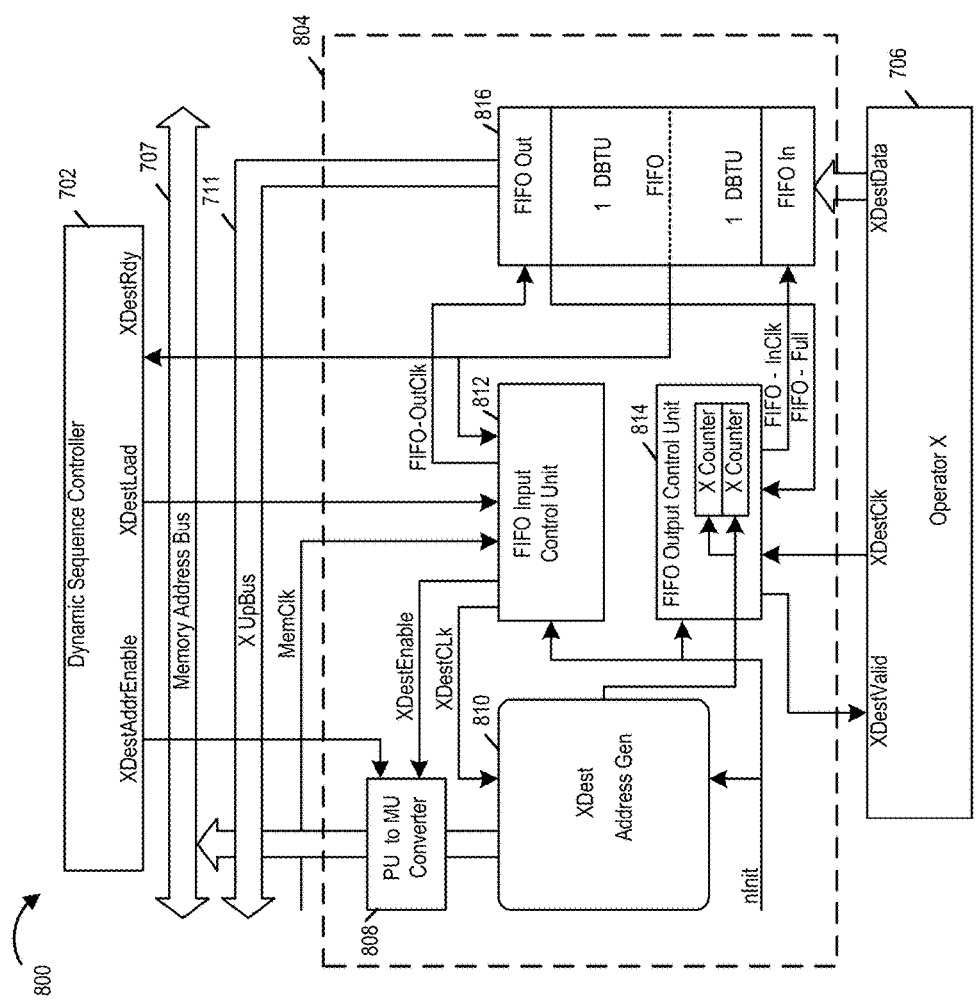
FIG. 8 illustrates the basic structure of an exemplary Destination Data Handler and how it interfaces to the Dynamic Sequence Controller, the Dynamic Sequence Controlled Bus Structure, and the Operator, in accordance with some embodiments.

FIG. 8 is a diagram 800 illustrating the basic structure of an exemplary Destination Data Handler 804 and how it interfaces to the Dynamic Sequence Controller (DSC) 702, a Dynamic Sequence Controlled Bus Structure (707, 711), and the Operator 706, in accordance with some embodiments. The exemplary destination data handler 804 includes a 2 dimensional source address generator illustrated in FIG. 8 as the XDest Address Generator 810, a FIFO unit 816, a FIFO input control unit 812, and a FIFO output control unit 814.

In various embodiments a low pulse on the nInit input signal triggers the address generator 810. The XDest Address Generator 810 generates an address to be placed on the Memory Address Bus 707 when the DSC 702 enables the Data Handler 804 with the XDestAddrEnable signal. In some embodiments if the data to be placed on the X UpData Bus 711 is going to another Data Handler, the XDestAddrEnable signal is not generated and the address in the Xdest Address Generator 810 is just a dummy address and will be discarded. However if the data is going to the Memory I/F Unit, e.g., memory I/F manager unit 114, the DSC 702 generates the XDestAddrEnable signal, which gates the address onto the Memory Address Bus 707.

Before the Data Handler 804 can start clocking data out of the FIFO 816 it waits until the DSC 702 indicates that the X UpBus 711 is ready to accept data. The DSC 702 generates a XDestload signal to indicate that the X UpBus 711 is ready which is provided to the FIFO input control unit 812. The FIFO input and output control units 812, 814 provide FIFO-OutClk and FIFO-InClk signals to the FIFO unit 816. Upon receiving the FIFO-OutClk signal from the control unit 812 the FIFO 816 starts clocking data out. In various embodiments, on the first rising edge of the MemClk after XDestLoad goes active, the destination Data Handler 804 starts clocking data out of its FIFO 816 and continues to clock data until 1 MemClk cycles after XDestLoad goes inactive.

Figure 9:
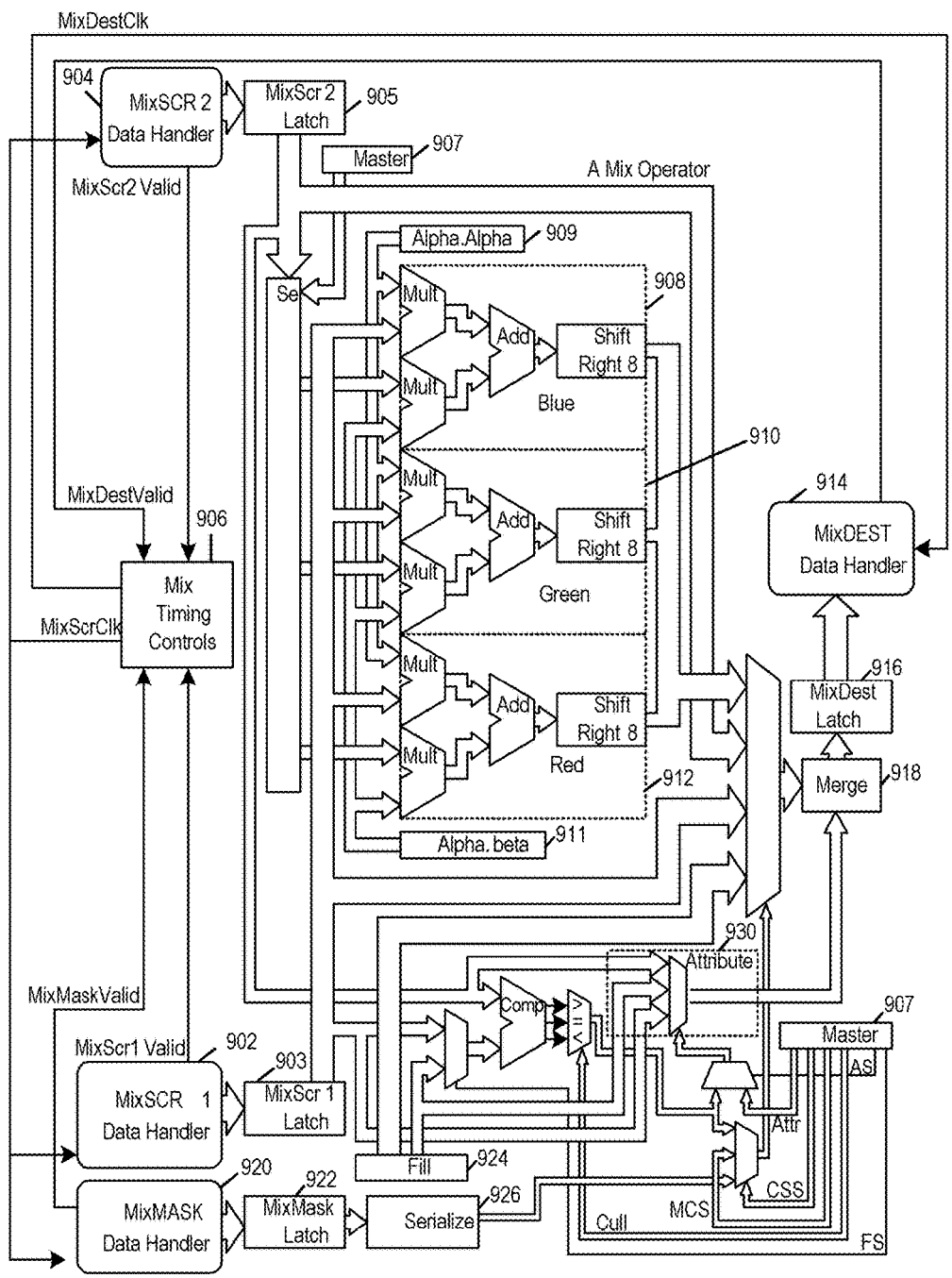
FIG. 9 is a drawing illustrating the use of an exemplary Video and Graphics Mixing Operator in accordance with one embodiment.

The system of the present invention uses one or more operators, e.g., processing units, to perform processing on data. In various embodiments there is no limit to type or number of Operators that can be installed in a given system, e.g., such as the dynamic sequence processing system. An embodiment of the present invention uses the processing of real-time video and graphics data. Thus for the purposes of discussing the operation of operators, consider an example of an operator that can be, and in some embodiments is, used in a real-time video-graphics processor. Examples of an operator that is used in real-time video-graphics processing system include a Mixing Operator and a Scaling Operator. FIG. 9 is a drawing 900 illustrating the use of an exemplary Video and Graphics Mixing Operator in accordance with one embodiment. The Mix Operator shown in FIG. 9 can be used as the Operator B shown in the system level block diagram illustrated in FIG. 2.

Consider drawing 900 of FIG. 9 which illustrates a plurality of elements interfacing with a mixing operator. Data is input into the exemplary Mix Operator via three Source Data Handlers, MixSCR1 902, MixSCR2 904, and MixMask 920. In the drawing 900 the Mix Operator includes the processing elements represented in the drawing using boxes having broken line boundary pattern, i.e., processing units 908, 910, 912 and 930. In the illustrated example of the Mixing Operator of FIG. 9 the input streaming data is ARGB data, that is, Attribute, Red, Green, Blue data elements. The individual processing units are used for processing corresponding input data elements as discussed further below. In some embodiments some of the Source Data Handlers need not be active on every mix operation. The Mix.Master register 907 determines what operation the Mix Operator performs and what Source Data Handlers should be supplying data to the Mix Operator for the operation. The Mix Operator output is streamed into the MixDEST Data Handler 914 which is the destination data handler.

In some embodiments the streaming data being processed in the Mix Operator is streaming ARGB data. Each data element (pixel) includes four independent components, i.e., the Attribute, the Red Color component, the Green Color component, and the Blue Color component. As illustrated in the figure, the Red, Green, and Blue components are processed one way (by processing elements 912, 910, 908 respectively) and the Attribute another way (by processing element 930). The Data inputs from MixSCR1 902 and MixSCR2 904, are in ARGB format and is supplied to further elements via the MixSCR1 latch 903 and MixSCR2 latch 905. The MixMASK Data Handler 920 supplies a different type of source data used by the Mix Operator to determine how to process the data in the other two Source Data handlers 902, 904. In various embodiments the four components are separated and each is processed independently. In some embodiments while the four components are processed independently, they are processed in parallel with each other.

Each of the processing elements 908, 910, 912 used for processing of the color components of the input data stream is a color processor. The color processors under the control of an Alpha register (mixes the color components, Red, Green, and Blue. In some embodiments the formula each color processor uses for processing is:

(MixSrc1.RGB*Alpha.Alpha)+
(MixScr2.RGB*Alpha.Beta)=MixDest.RGB

In some embodiments the values in the Alpha register, Alpha.Alpha 909 and Alpha.Beta 911, are both values between 0 and 1 inclusive. In an ideal case, the values programmed in the Alpha register should meet the following requirement, but this is not an absolute requirement.

Alpha.Alpha+Alpha.Beta=1

FIG. 10 shows a table 1000 showing in column 1002 the fields in the Mix.Master register 907 that determine what color values and what Attribute values are routed to the MixDEST Data Handler 914. Also shown in columns 1004, 1006 of the table 1000 is how the Attribute Compare processor and the Mask Data (Mix.MASK) also effect the data flow controls. The last two columns 1008, 1010 show source origination of the data latched into the MixDEST Data Handler 914 for each data flow control setup.

In various embodiments the results of the four processes, i.e., processing performed by units 908, 910, 912 and 930, are then merged together back into ARGB format before outputting the results to the MixDEST Data Handler 914.

FIG. 11 illustrates a table 1100 showing the content of the registers that store control values used to control the operation of the Mix Operator.

It should be appreciated that between the block diagram drawing 900 of the DSPS Video and Graphics Mixing Operator, the Mix Operation Master Control table 1000, the list of Mix Operator registers 1100, and the discussion of the Mix Operator, a person skilled in the art would be able to design a Mix Operator.

Figure 12:
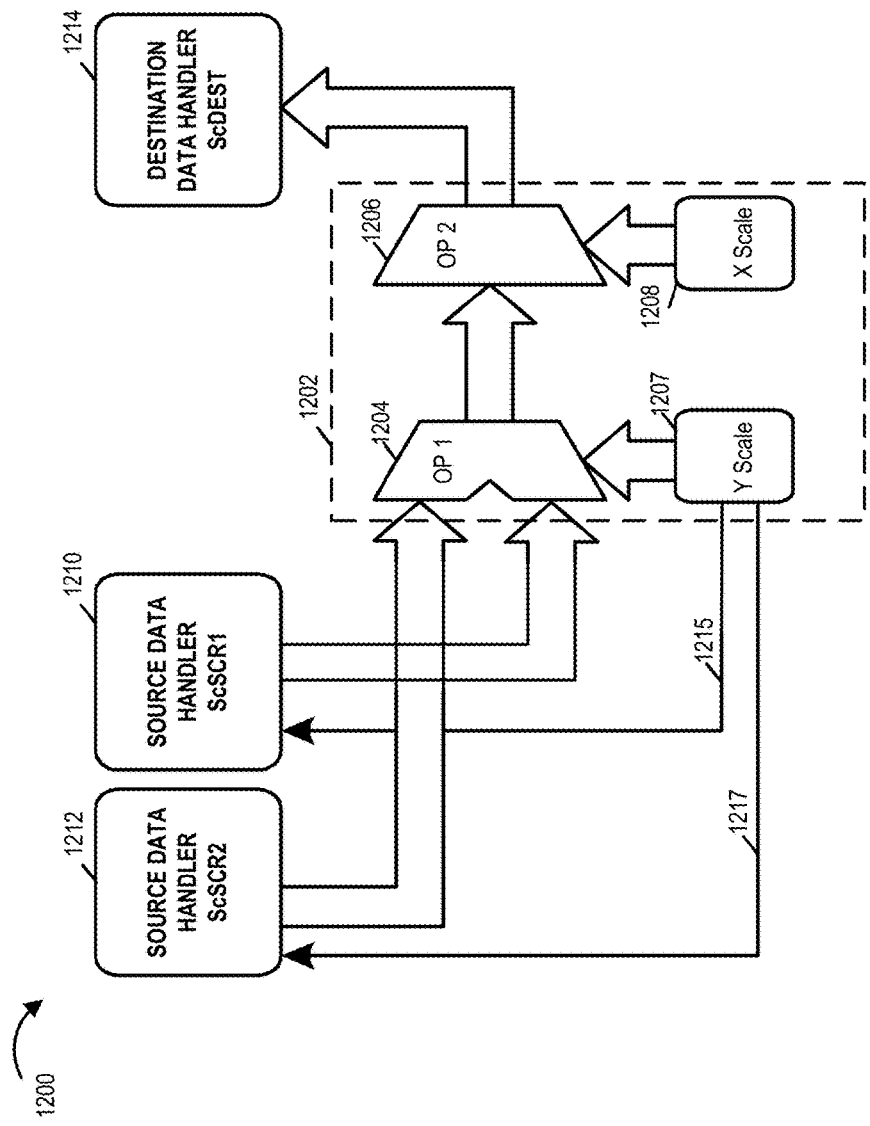
FIG. 12 illustrates an exemplary scaling operator unit with different scaling operators that perform scaling operation in the X (horizontal) and Y (vertical) dimension.

Another example of an Operator included herein to demonstrate the flexibility of the DSPS system of the present invention is a Video Scaling Operator. FIG. 12 is a drawing 1200 illustrating the use of exemplary Scaling Operators in one exemplary embodiment. With reference to the system level block diagram of the DSPS illustrated in FIG. 2, the Scaling Operator shown in FIG. 12 can be used to replace the Operator A 130 shown in FIG. 2.

FIG. 12 shows a scaling operator unit 1202 with different scaling operators that perform scaling operation in the X (horizontal) and Y (vertical) dimension, two source data handlers 1210, 1212 and a destination data handler 1214. Data is input into the scaling operator unit from source data handlers ScSCR1 1210 and ScSCR2 1212. The Results of the scaling operations are output to the destination data handler ScDEST 1214.

In Video Scaling there are a number of algorithm techniques and formulations that can be used to achieve the desired scaling quality. In some systems it is preferred to scale the Y (vertical) dimension before scaling the X (horizontal) dimension. In the illustrated example, the scaling unit 1202 is a 2×N scaling engine, The Y Scale operation uses 2 data points and the X Scaling operation uses N data points. The 2 data points for the Y Scaling operation are input from the source data handlers ScSCR1 1210 and ScSCR2 1212. A higher-quality scaling operation, may need more source data handlers and thus additional may need to be added. In the 2 data point Y Scaling operator 1204, the data input from the ScSCR1 1210 and ScSCR2 1212 are two adjacent lines of the same image. The two source data handlers 1210, 1212 are programmed to source data from the same 2-dimensional image. For example in one embodiment ScSCR1 1210 inputs line one of the image while ScSCR2 1212 inputs line two of the same image. If the scaling unit 1202 is scaling down the source image, some of the source lines could be skipped during the Y scaling operation. And if the scaling unit 1202 is scaling up the source image, some of the source lines could be used repeatedly during the Y scaling operation. As a result, as the drawing 1200 shows, the Y Scaling Operation provides a feedback signal (1215, 1217) to inform the two source data handlers 1210, 1212 when to either skip a line or when to repeat a line. The feedback signal affects the Pitch controls of the data handler. For example for up scaling, when the feedback is active, this controls the data handler to input the same line of data again. For down scaling, when the feedback is active, this control the data handler to skip a line of data.

The X Scaling operator 1206 input will be the Y Scaling operator 1204 output. For the X Scaling operation on a stream of Q inputs pixels with an output stream of R pixels, if the operation is an up scale operation, R will be greater than Q, and if it's a down scale operation, R will be less than Q.

In accordance with one feature, to each Data Handler in a DSPS system, the DSC unit supplies a unique nInit signal. The Post bit in the DSPS Master Control Register (Master-.Post) controls the nInit signal. The registers in the system except the DSPS Master register are shadow registers. A shadow register is a register that a programmer can read and write but the shadow register has no effect on the system. In some embodiments every shadow register has a companion execution register, which does have an effect on the system. In some embodiments a programmer can write to the shadow registers at will and when the instructions need to be loaded into the execution registers, the DSPS.Master.Post is set high. This results in the shadow registers being copied to their companion execution register in one MemClk cycle. As the shadow registers are being copied into the execution registers, the DSPS.Master.Post bit is cleared automatically by hardware. At this point the system is said to be primed for a new operation. The Data Handlers and Operators that are to be affected by the new operation are ready to process data and what is needed is some additional SeqOp Code Words to be inserted into the SeqOp list.

Figure 13:
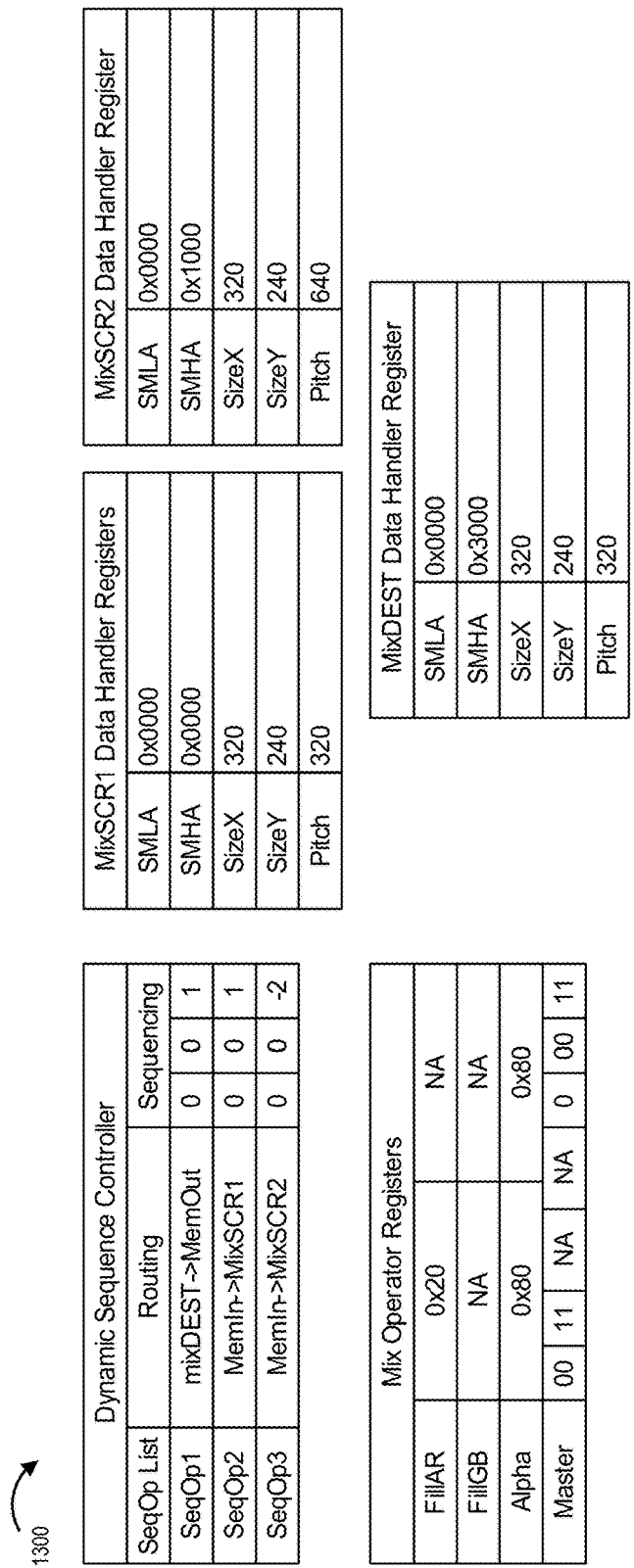
FIG. 13 illustrates a set of exemplary tables showing the register settings in various Data Handlers and a Mix Operator, and the setting of SeqOp Code words in a SeqOp Code List.

An example discussing the system and features of the present invention will now be discussed by which the flexibly and power of the DSPS can be appreciated. Consider a scenario of adding a new operation in the middle of another on-going operation currently in progress. Consider that the on-going operation is an alpha blend and Attribute replacement operation. Consider that for the on-going operation, the DSPS is blending two images, InImageA and InImageB, to produce a resultant image, OutImageC. The blending operation uses the Mix Operator that performs mixing operation as discussed with regard to FIGS. 9-11. A MixSCR1 Data Handler manages InImageA and a MixSCR2 Data Handler manages InImageB. A MixDEST Data Handler manages OutImageC. Consider that the three images are 320×240 pixels in dimension, InImageB is a 320×240 pixel region of a larger 640×480 image, and therefore the Pitch setting for the MixSCR2 data handler is 640. Consider that the top left most pixel on InImageA is at memory address 0x00000000, the top left most pixel on InImageB is at memory address 0x10000000, and the top left most pixel on InImageA is at memory address 0x30000000. The set of tables 1300 included in FIG. 13 show the register settings in each of the three Data Handlers and the Mix Operator, and the setting of the SeqOp Code words in the SeqOp List. In this operation just three SeqOp Code words are used. The first SeqOp code word instructs the MixDEST Data Handler to transfer data to the Memory I/F where it is stored, starting at memory address 0x30000000. The second SeqOp code word instructs MixSCR1 Data Handler to fetch data from the Memory I/F starting at memory address 0x00000000. The third SeqOp code word instructs the MixSCR2 Data Handler to fetch data from the Memory I/F starting at memory address 0x10000000. The two Source Data Handlers present the data to the Mix Operator for processing in a precision pixel-by-pixel pipeline fashion. Pixels InImageA[0,0] and InImageB[0,0] both are clocked into the Mix Operation on the same MemClk clock edge. Pixels InImageA[1,0] and InImage[1,0] follows on the next MemClk clock edge. The pixels in the area defined by the SizeX and SizeY registers of each Source Data Handler are clocked into the Mix Operator by this precision clocking sequence. Pixels InImageA[0,0] and InImageB[0,0] follow pixels InImageA[320,240] and InImageB[320,240] in the same fashion, so that the operation continues to operate on frame after frame of video data.

The Mix Operator performs the same two parallel operations on every pair of source pixels. One operation is the color blend operation that affects the RGB components of each ARGB pixel.

MixDEST.RGB=(MixSRC1.RGB*$A$1pha.Alpha)+
(MixSCR2.RGB*Alpaha.Beta)

In this example because Alpha.Alpha=Alpha.Beta=0x80, the blend will be:

MixDEST.RGB=(½*MixSCR1.RGB)+
(½*MixSCR2.RGB)

The other operation is the attribute operation that effects the A component of each ARGB pixel.

MixDEST.$A$=FillAR.Attribute.

In this example because FillAR.Attribute=0x20:

MixDEST.$A$=0x20.

In the discussed example the Mix Operator continuously processes pixels and is not affected by the activity of the dynamic sequence controller (DSC). The DSC determines when each Data Handler has control of the Data Bus. In this example because there are only three SeqOp code words in the code list, each Data Handler has an opportunity to use the Data Bus for one DBTU period every third DBTU period. In this example, no SeqOp code words are discarded in DBTU periods. Every Data Handler uses its allotted DBTU periods.

Figure 14:
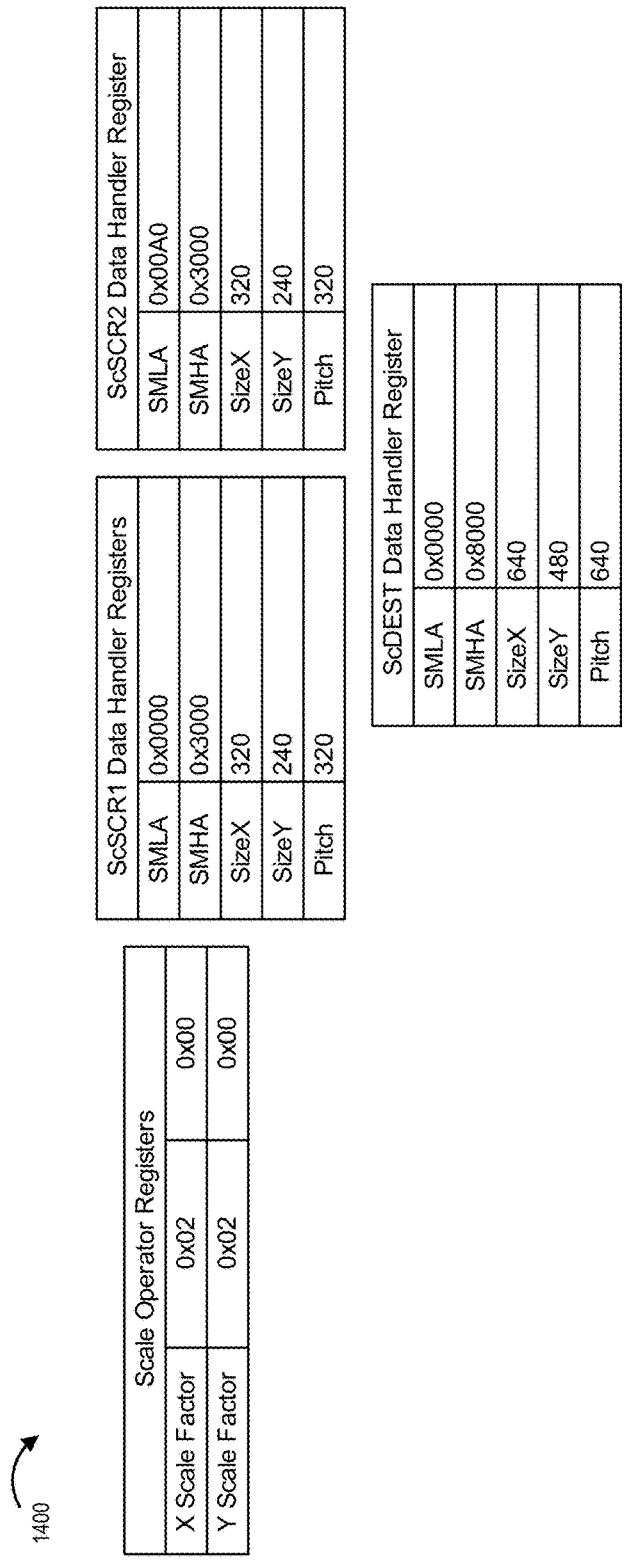
FIG. 14 illustrates a set of exemplary tables showing the register settings used in an example in various Data Handlers.

The Scaling operation and the DSPS activity will now be discussed. For the scaling operation the 320×240 image stored at OutImageC is scaled up to 640×480, and stores in memory as OutImageD. Because the scaling operation is a 2× scale (320×240 to 640×480), both the X and Y Scale Factors are set to 2.0 in the scaling operator. The ScSCR1 Data Handler registers are programmed with the exact same values as the MixDEST Data Handlers register. This is because both Data Handlers are managing the same memory area, OutImageC. ScSCR2 is also the same as MixDEST data handler, with the exception of the Start Memory Low Address (SMLA) register. This is because ScSCR2 defines the same memory area, but starts on the second line of the OutImageC image. The ScSCR1 Start Memory Address points to the address of pixel OutImageC[0,0], and the ScSCR2 Start Memory Address points to the address of pixel OutImageC[0,1]. The ScDEST Data Handler defines an area of 640×480 pixels at OutImageD, where the address of pixel OutImageD[0,0] is 0x80000000. The set of exemplary tables 1400 (Shown in FIG. 14) show the register settings in each of the Data Handlers.

The exemplary table 1500 shown in FIG. 15 shows the setting of the SeqOp Code words in the exemplary SeqOp List considered for the discussed example. After the registers are programmed, the SeqOp code word list is modified to give the ScSCr1, ScSCR2, and ScDEST Data Handlers DBTU bus periods. Thus three new SeqOp Code words are added. One for each of the three scaling operations Data Handlers. In the example the branching enable bit is active in the SeqOp6 (first column under Sequencing is set to one). Thus when SeqOp6 is being staged in the DSC, if the ScDEST Data Handler is not ready to supply data to the Data Bus, the DSC will discard SeqOp6 and branch to the SeqOp4 code word and try to execute it. The DSC continues to loop through the cycle, SeqOp4, SeqOp5, and SeqOp6 until the ScDEST Data Handler is ready to supply data to the Data Bus. While in this loop the DSC continues to allow the Scaling Operation Data Handlers ScSCR1 and ScSCR2 to input data into the Scaling Operation until the Scaling Operator finally produces some output. Once the ScDEST becomes ready to supply data to the data bus, the SeqOp6 code word will execute and SeqOp1 will be fetched for staging.

At this point everything is ready for the scaling operation to commence, but the SeqOp3 is still programmed to branch back to SeqOp 1 and the DSC never fetches SeqOp4, SeqOp5, and SeqOp6. The only thing left to do is to change SeqOp3, e.g., by re-programming In order to re-program SeqOp3, the Branch enable bit is enabled just like in SeqOp6. The logic for doing this is that if MixSCR2 is unable to accept more data, it's because its FIFO is full. This means that the Mix Operation is probable stalling because the MixDEST FIFO is full and cannot accept more data from the Mix Operator. In order to get the Mix Operator out of its stalled state, some data needs to be taken out of the MixDEST FIFO. Therefore branching back to SeqOp1 should be done and MixDEST should be given a DBTU period to remove some data from its FIFO. The DSC stays in this loop, SeqOp1, SeqOp2, and SeqOp3 until MixSCR2 is able to accept data again.

It should be noticed that after the scaling operation is added, the total bandwidth of the Data Bus is split between the two operations, Scaling and Mixing. No Data bus bandwidth is lost to system management or system housekeeping. Even when the new operation is cut in, not even one MemClk clock period is lost to system management. Through SeqOp programming, each operation is given some dynamic control over its allowed bandwidth percentage. It should be appreciated that when either operation goes into a stall state, the DSC reallocates the Data Bus usage to give the stalled operation 100% of the bus bandwidth until the stall condition is corrected.

It should be appreciated that one of the things, among various other novel features, that makes the processing of the present invention different from other processing systems is that it is designed to process multiple streams of constantly changing data smoothly and effortlessly. Other processes, such as those using a DSP or a General Purpose Processor, would not achieve what the processing system can do with ease. It should be appreciated that in the system of the present invention there are no caches to flush and there are no code fetch cycles competing with the data for bus bandwidth.

Various features of the present invention are implemented using modules. Such modules may, and in some embodiments are, implemented as software modules. In other embodiments the modules are implemented in hardware, e.g., as circuits. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention.

What is claimed is:

1. An apparatus for processing data, said apparatus comprising:
a memory bus;
a dynamic sequence controller including an execution unit and a staging element;
a processing unit for performing a processing operation on data loaded into the processing unit;
a first memory including a data memory block including input data to be supplied to the processing unit and output data received from said processing unit and a stored sequence operational code list including a sequence of operational codes to be executed by said execution unit of said dynamic sequence controller to control data transfer into and out of said data memory block;
wherein said dynamic sequence controller is coupled to said first memory;
wherein said dynamic sequence controller is configured to receive a current operational code from said stored sequence operational code list;
wherein said staging element is configured to load said received operational code into said execution unit when both: i) a data source identified by a source identifier is ready to provide data and ii) a data destination identified by a destination identifier is ready to receive data;
wherein said staging element is further configured to skip loading of said received operational code into said execution unit when at least one of said data destination and said data source are not ready;
wherein said dynamic sequence controller further includes:
a source qualifier configured to determine, based on a source ready signal from the processing unit, if the data source identified, by the source identifier associated with said received operational code, is ready for a data transfer and to generate a source address enable signal when it is determined that the data source, identified by the source identifier associated with said received operational code, is ready for a data transfer; and
a destination qualifier configured to determine, based on a destination ready signal from the processing unit, if the data destination, identified by the destination identifier associated with said received operational code, is ready for the data transfer; and
wherein said execution unit is configured to execute operational codes loaded by said staging element into said execution unit based on memory bus availability, said execution unit being different from said processing unit.

2. The apparatus of claim 1,
wherein said processing unit includes a first data operator unit; and
wherein said apparatus further includes:
a first data input buffer for said first data operator unit, said data destination being said first data operator unit.

3. The apparatus of claim 1, further comprising:
a first data operator unit configured to process said input data and store the result of said processing in a first data output buffer corresponding to said first data operator unit.

4. The apparatus of claim 1, further comprising:
a second memory including stored multimedia data.

5. The apparatus of claim 4, wherein the first memory and the second memory are part of a memory array.

6. The apparatus of claim 5, wherein the first memory is part of a first memory chip and the second memory is part of a second memory chip which is separate from said first memory chip.

7. A method of processing data, the method comprising:
storing, in a first memory, a data memory block including input data to be supplied to a processing unit and output data received from said processing unit and a sequence operational code list including a sequence of operational codes to be executed by an execution unit of a dynamic sequence controller to control data transfer into and out of said data memory block;
operating said dynamic sequence controller, coupled to said first memory and including said execution unit and a staging element, to receive a current operational code from said stored sequence operational code list;
operating said staging element in the dynamic sequence controller to load said received operational code into the execution unit in the dynamic sequence controller when both: i) a data source, identified by a source identifier, is ready to provide data and ii) a data destination, identified by a destination identifier, is ready to receive data, and operating said staging element in the dynamic sequence controller to skip loading of said received operational code into said execution unit when at least one of said data destination and said data source are not ready;

operating a source qualifier in the dynamic sequence controller to determine, based on a source ready signal from the processing unit, if the data source, identified by the source identifier associated with said received operational code, is ready for a data transfer and to generate a source address enable signal when it is determined that the data source, identified by the source identifier associated with said received operational code, is ready for a data transfer;

operating a destination qualifier in the dynamic sequence controller to determine, based on a destination ready signal from the processing unit, if the data destination, identified by the destination identifier associated with said received operational code, is ready for the data transfer;

operating said execution unit to execute an operational code loaded by said staging element into said execution unit based on memory bus availability; and operating the processing unit to perform a processing operation on data transferred into the processing unit via a memory bus under the control of the dynamic sequence controller.

8. The method of claim 7, wherein said processing unit includes a first data operator unit, the method further comprising:

operating the first data operator unit to process said input data and store the result of said processing in a first data output buffer corresponding to said first data operator unit.

9. The method of claim 7, further comprising:
storing multimedia data in a second memory.

10. The method of claim 9, wherein the first memory and the second memory are part of a memory array.

* * * * *